United States Patent
Shinohara et al.

(10) Patent No.: US 11,343,752 B2
(45) Date of Patent: May 24, 2022

(54) COMMUNICATION APPARATUS, COMMUNICATION SYSTEM, COMMUNICATION METHOD, AND COMMUNICATION PROCESSING PROGRAM

(71) Applicant: Rakuten Group, Inc., Tokyo (JP)

(72) Inventors: Hiroshi Shinohara, Setagaya-ku (JP); Yoshiro Matsuda, Setagaya-ku (JP)

(73) Assignee: Rakuten Group, Inc., Tokyo (JP)

( * ) Notice: Subject to any disclaimer, the term of this patent is extended or adjusted under 35 U.S.C. 154(b) by 115 days.

(21) Appl. No.: 16/642,682

(22) PCT Filed: Aug. 30, 2017

(86) PCT No.: PCT/JP2017/031198
§ 371 (c)(1),
(2) Date: Feb. 27, 2020

(87) PCT Pub. No.: WO2019/043839
PCT Pub. Date: Mar. 7, 2019

(65) Prior Publication Data
US 2020/0205056 A1    Jun. 25, 2020

(51) Int. Cl.
*H04W 48/02* (2009.01)
*H04W 76/20* (2018.01)
(Continued)

(52) U.S. Cl.
CPC ............ *H04W 48/02* (2013.01); *H04W 4/80* (2018.02); *H04W 76/14* (2018.02); *H04W 76/25* (2018.02);
(Continued)

(58) Field of Classification Search
CPC ....... H04W 4/80; H04W 48/02; H04W 76/14; H04W 76/25; H04W 84/12; H04W 88/10; H04W 92/18
See application file for complete search history.

(56) References Cited

U.S. PATENT DOCUMENTS

| 2013/0079037 A1* | 3/2013 | Dobyns | H04W 4/21 455/456.3 |
| 2016/0098691 A1 | 4/2016 | White et al. | |

(Continued)

FOREIGN PATENT DOCUMENTS

JP    2010-213334 A    9/2010

OTHER PUBLICATIONS

International Search Report for PCT/JP2017/031198 dated Nov. 14, 2017 (PCT/ISA/210).
(Continued)

*Primary Examiner* — Brian P Cox
(74) *Attorney, Agent, or Firm* — Sughrue Mion, PLLC

(57) ABSTRACT

This first communication apparatus is provided with: a first communication unit which, after establishing a link necessary for first near field communication with a communication counterpart existing within a first communication available range, performs the first near field communication with the link-established communication counterpart; and a second communication unit which performs second near field communication with a communication counterpart existing within a second communication available range that is narrower than the first communication available range. In a case where detecting that a portable storage medium with which the second near field communication is available enters the second communication available range, the first communication apparatus transmits, through the first communication unit, detection information which indicates that the portable storage medium enters the second communica-
(Continued)

tion available range to a link-established second communication apparatus. In a case where receiving the detection information from the first communication apparatus, the second communication apparatus limits the transmission and reception of data through the first near field communication with communication counterparts other than the first communication apparatus which has transmitted the detection information, while maintaining the establishment of each link with each of a plurality of link-established communication counterparts.

20 Claims, 12 Drawing Sheets

(51) Int. Cl.
| | |
|---|---|
| H04W 76/25 | (2018.01) |
| H04W 76/14 | (2018.01) |
| H04W 4/80 | (2018.01) |
| H04W 88/10 | (2009.01) |
| H04W 84/12 | (2009.01) |
| H04W 92/18 | (2009.01) |

(52) U.S. Cl.
CPC ............ *H04W 88/10* (2013.01); *H04W 84/12* (2013.01); *H04W 92/18* (2013.01)

(56) References Cited

U.S. PATENT DOCUMENTS

| | | | |
|---|---|---|---|
| 2016/0261975 A1* | 9/2016 | Kurihara | H02J 50/80 |
| 2016/0359766 A1* | 12/2016 | Pawar | H04L 1/1678 |
| 2017/0142639 A1* | 5/2017 | Meredith | H04W 48/10 |
| 2017/0143293 A1 | 5/2017 | Park et al. | |

OTHER PUBLICATIONS

Karima Maalaoui et al., "Priority Based Intra Piconet Scheduling Scheme for QoS Guaranties in Bluetooth Networks", IEEE, 2009, pp. 147-152 (6 pages).

\* cited by examiner

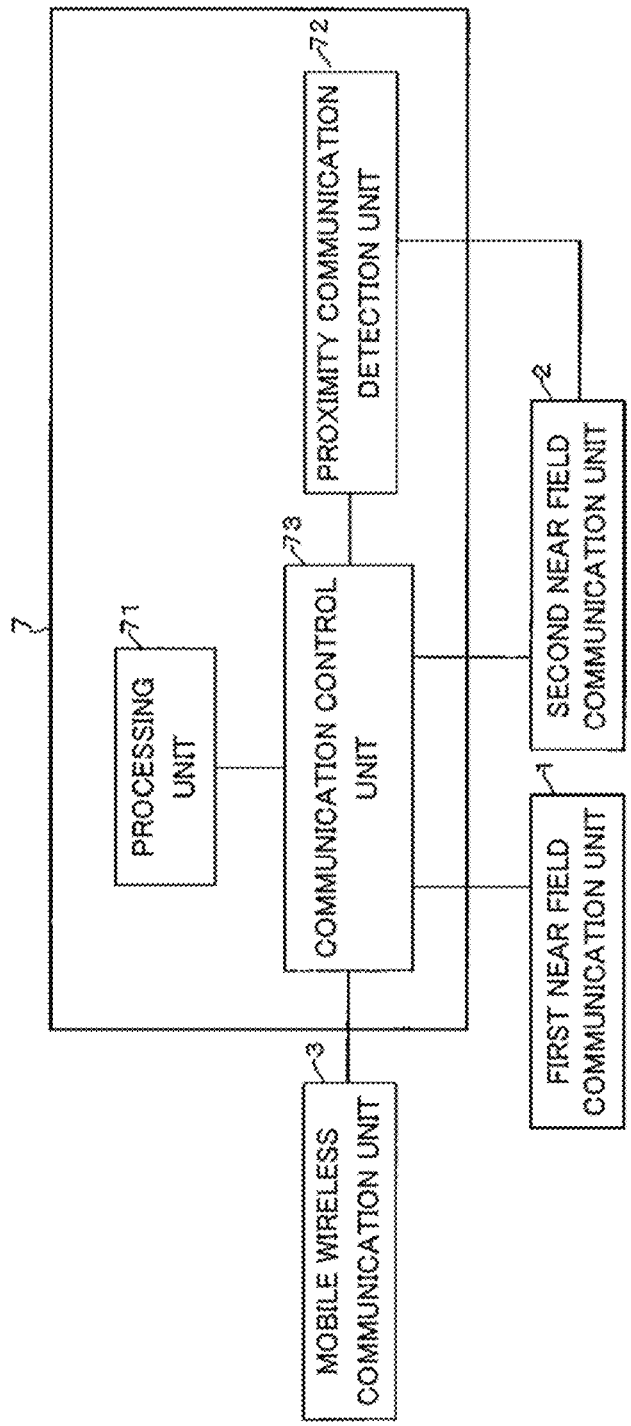

FIG.4(A)

COMMUNICATION PARTNER LIST
OF COMMUNICATION APPARATUS CM1

| IDENTIFICATION INFORMATION | COMMUNICATION RESTRICTION PRESENCE AND ABSENCE VALUE |
|---|---|
| S0000001 (CS1) | 0 (ABSENCE) |
| S0000002 (CS2) | 1 (PRESENCE) |
| S0000003 (CS3) | 1 (PRESENCE) |
| S0000004 (CS4) | 1 (PRESENCE) |

FIG.4(B)

COMMUNICATION PARTNER LIST
OF COMMUNICATION APPARATUS CS1

| IDENTIFICATION INFORMATION | COMMUNICATION RESTRICTION PRESENCE AND ABSENCE VALUE |
|---|---|
| M0000001 (CM1) | 0 (ABSENCE) |
| M0000002 (CM2) | 1 (PRESENCE) |
| M0000003 (CM3) | 1 (PRESENCE) |
| M0000004 (CM4) | 1 (PRESENCE) |

FIG.5(A)

COMMUNICATION PARTNER LIST
OF COMMUNICATION APPARATUS CS1

| IDENTIFICATION INFORMATION | COMMUNICATION RESTRICTION PRESENCE AND ABSENCE VALUE |
|---|---|
| M0000001 (CM1) | 0 (ABSENCE) |
| M0000002 (CM2) | 1 (PRESENCE) |
| M0000003 (CM3) | 1 (PRESENCE) |
| M0000004 (CM4) | 1 (PRESENCE) |

FIG.5(B)

COMMUNICATION PARTNER LIST
OF COMMUNICATION APPARATUS CS1

| IDENTIFICATION INFORMATION | COMMUNICATION RESTRICTION PRESENCE AND ABSENCE VALUE |
|---|---|
| M0000001 (CM1) | 1 (PRESENCE) |
| M0000002 (CM2) | 0 (ABSENCE) |
| M0000003 (CM3) | 1 (PRESENCE) |
| M0000004 (CM4) | 1 (PRESENCE) |

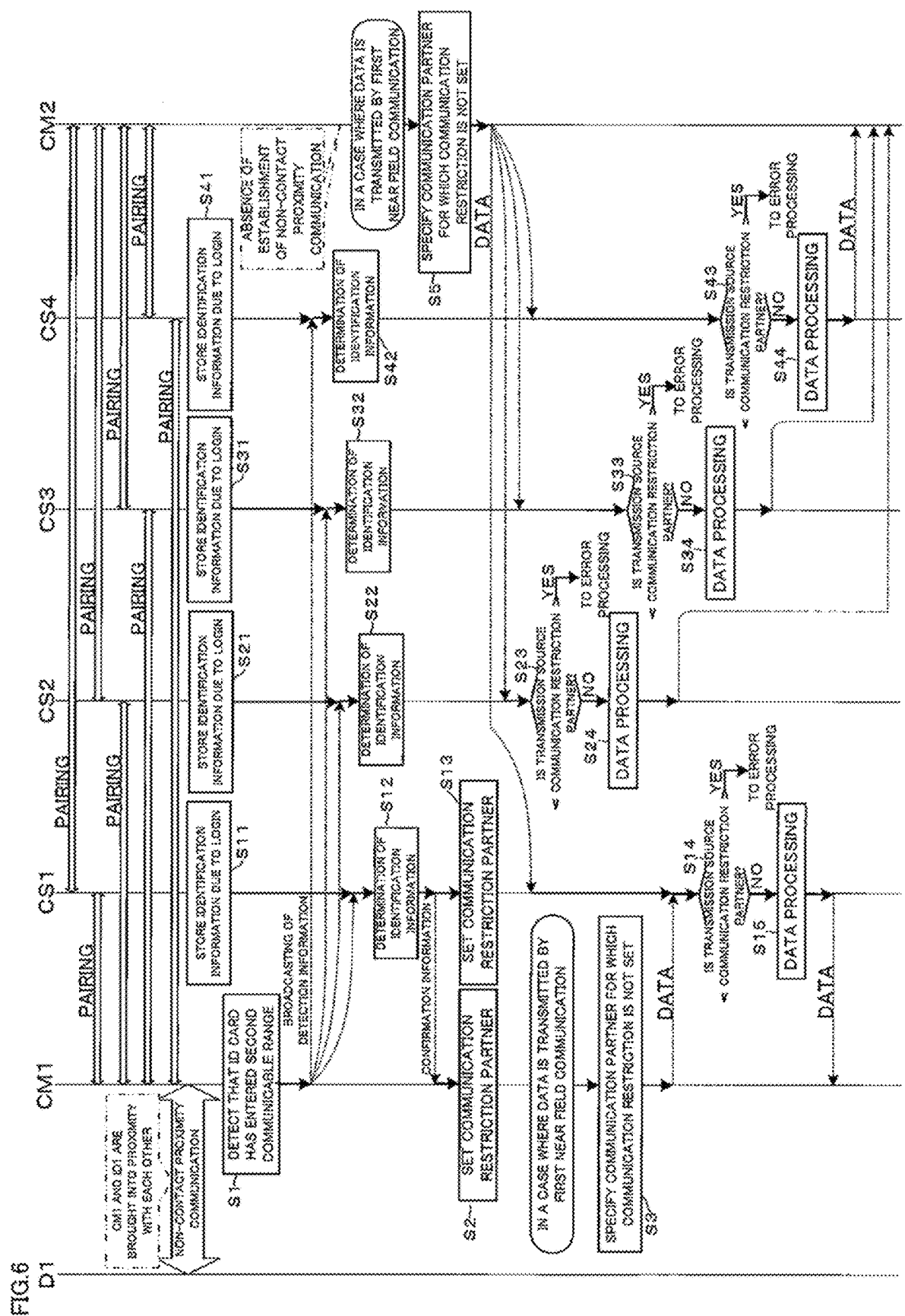

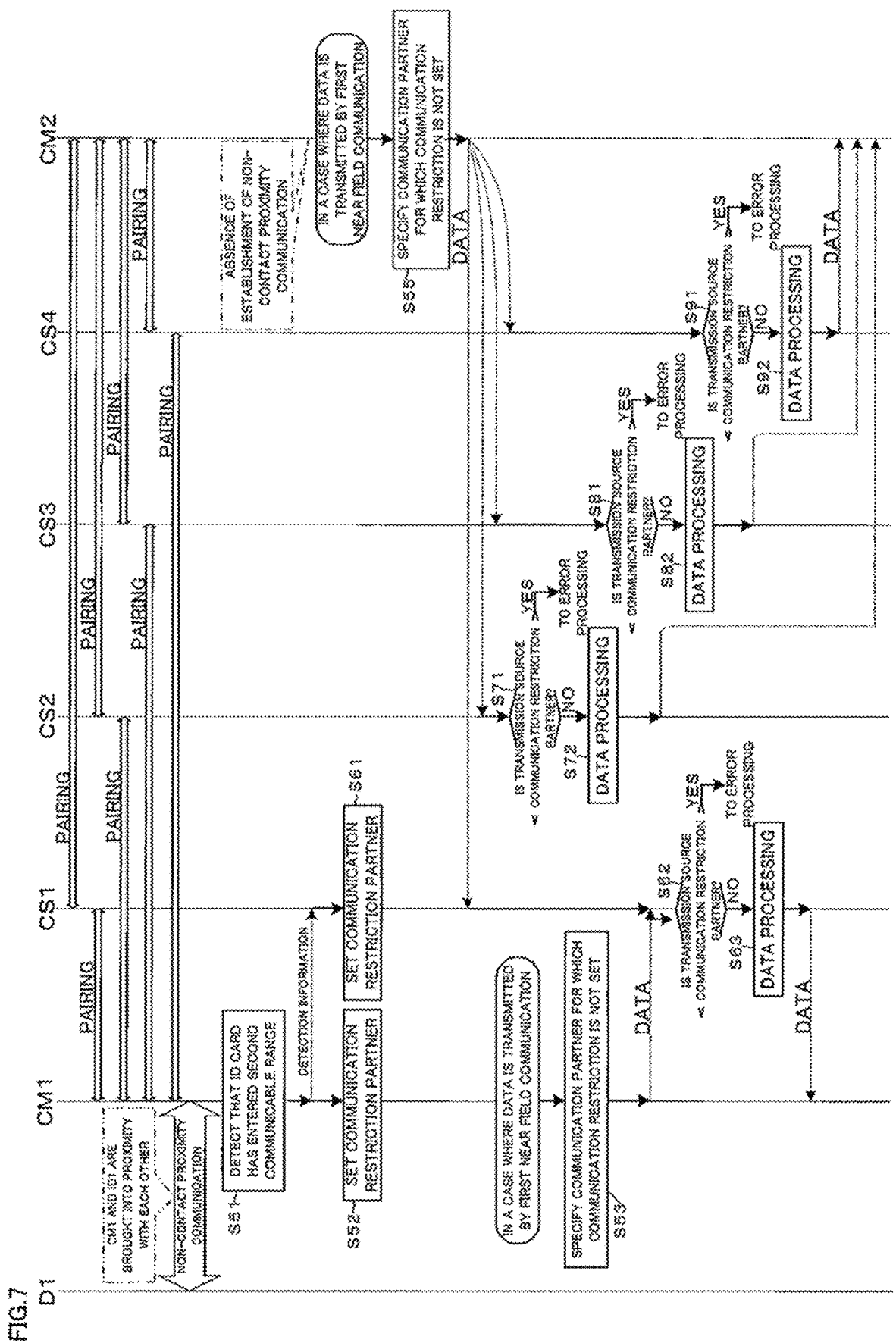

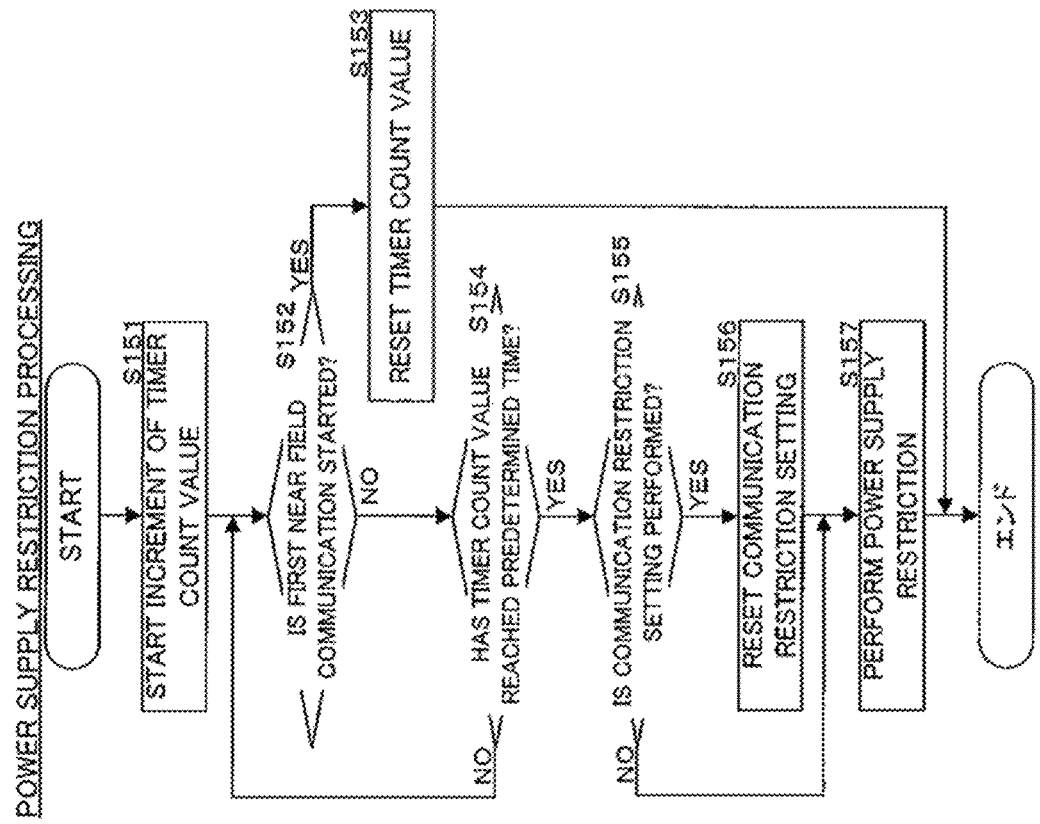

FIG.10
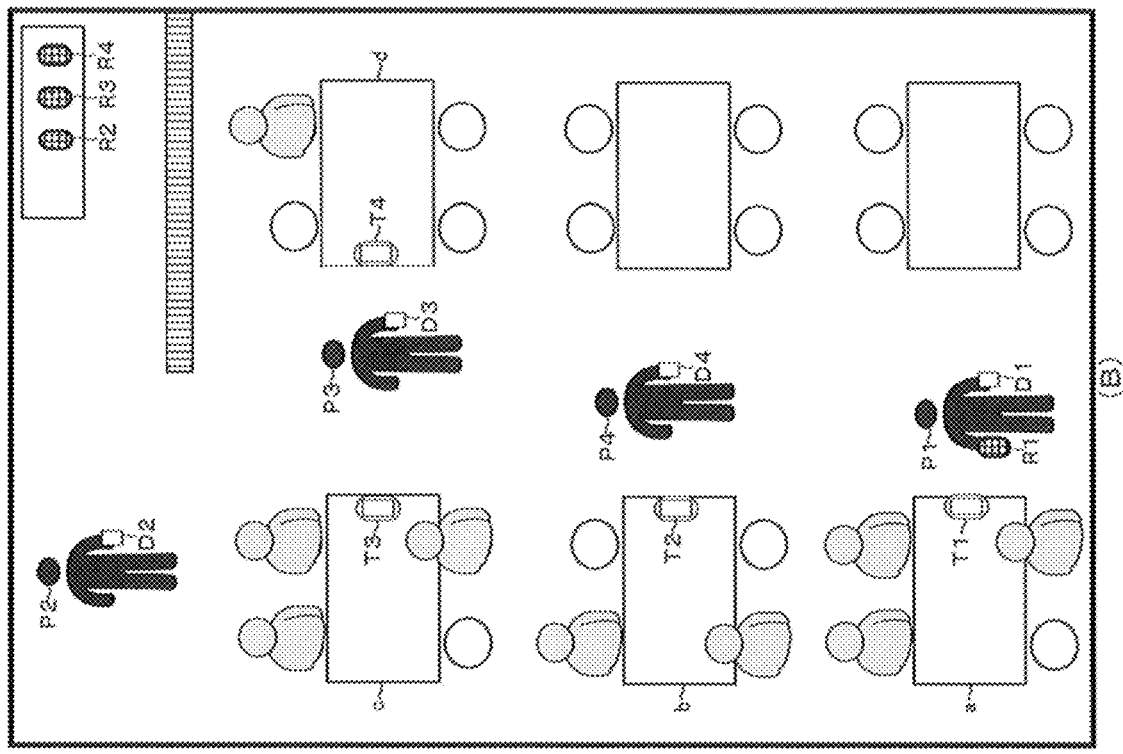
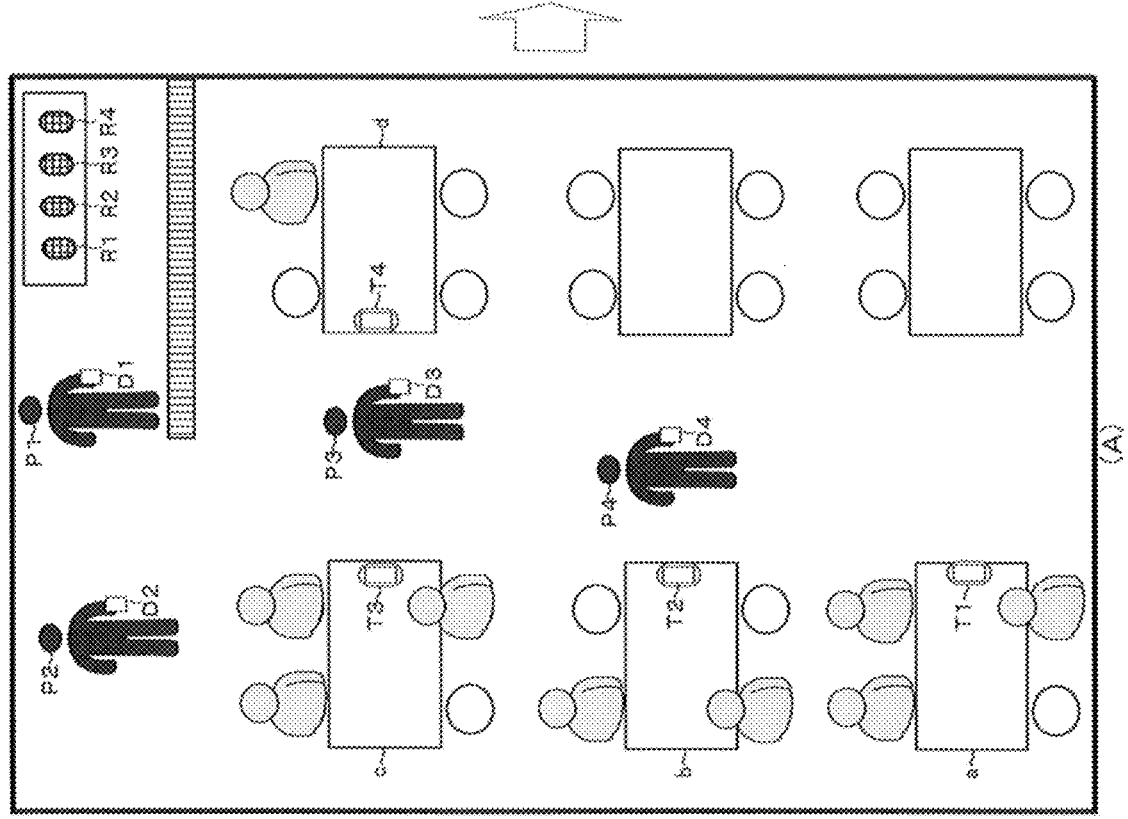

COMMUNICATION APPARATUS, COMMUNICATION SYSTEM, COMMUNICATION METHOD, AND COMMUNICATION PROCESSING PROGRAM

CROSS REFERENCE TO RELATED APPLICATIONS

This application is a National Stage of International Application No. PCT/JP2017/031198 filed Aug. 30, 2017.

TECHNICAL FIELD

The present invention relates to the technical field of a communication system in which one communication apparatus can perform near field communication with each of a plurality of communication apparatuses.

BACKGROUND ART

Conventionally, wireless LAN standards such as Bluetooth (registered trademark) (hereinafter referred to as "BT") and Wi-Fi (registered trademark) are known as near field communication standards. For example, in the near field communication method based on BT, the communication apparatuses are classified into a master apparatus and a slave apparatus. Then, in the near field communication method based on BT, after a link is established (multipoint-connected) by pairing between one master apparatus and each of a plurality of slave apparatuses, the master apparatus can perform near field communication simultaneously with a plurality of slave apparatuses for which the link is established. Here, pairing means a procedure for establishing a link between the master apparatus and the slave apparatus (in other words, a procedure for associating the master apparatus and the slave apparatus). Then, once pairing is performed, the establishment of the link is maintained unless the pairing is removed even if the power of the master apparatus or the slave apparatus is turned off, for example, and near field communication can be performed immediately if the master apparatus and the slave apparatus are within a communicable range (communicable zone). Note that Patent Document 1 discloses a technology (handover technology), in which, for example, authentication information of a wireless LAN or BT is transmitted using an infrared communication method or a non-contact proximity communication method based on near field radio communication (NFC), and authentication setting of the wireless LAN or BT using the authentication information is performed, so that a user can automatically use a communication function related to the wireless LAN or BT without being conscious of the authentication processing and the setting processing.

CITATION LIST

Patent Document

Patent Document 1: Japanese Patent Application Laid-Open Publication No. JP 2010-213334 A

DISCLOSURE OF INVENTION

Problems to be Solved by the Invention

By the way, as described above, in the near field communication, maintaining the establishment of a link between a plurality of communication apparatuses is efficient because the time and the like of the user can be reduced. However, it may be necessary to perform near field communication only between specific two communication apparatuses in an arbitrary time zone during link establishment between one communication apparatus (for example, master apparatus) and each of a plurality of communication apparatuses (for example, slave apparatuses). Examples of such a case include a case where particularly quick processing is required in at least one of the two communication apparatuses, a case where it is particularly required to prevent the false recognition or confusion of the user who uses the communication apparatus, or a case where it is necessary to prevent the outflow of information exchanged between the two communication apparatuses. In such a case, the near field communication function of another communication apparatus not performing near field communication with the above-described two communication apparatuses in the above-described arbitrary time zone can be turned off by the user's operation. However, such operation is not efficient, and this becomes more remarkable as the number of other communication apparatuses for which a link is established with a specific communication apparatus increases.

Therefore, the present invention has been made in view of the above points and the like, and has an object to provide a communication apparatus, a communication method, and a communication processing program capable of efficiently restricting transmission and reception of data by near field communication with another communication apparatus not performing the near field communication in an arbitrary time zone, while maintaining establishment of links between a specific communication apparatus and each of a plurality of communication apparatuses (communication partners).

Solutions to the Problems

In order to solve the above described object, an invention according to claim 1 is characterized by a communication apparatus that establishes a link necessary for first near field communication with a plurality of communication partners existing in a first communicable range, and then performs the first near field communication with the communication partners for which the link is established, wherein in a case where detecting a portable storage medium that has entered a second communicable range narrower than the first communicable range, each of the communication partners transmits detection information indicating that the portable storage medium has entered the second communicable range to the communication apparatus for which the link is established by the first near field communication, and the communication apparatus comprising a communication control unit that, in a case where the detection information transmitted from any one of the plurality of communication partners for which the link is established is received, while maintaining establishment of the link with each of the plurality of communication partners for which the link is established, restricts transmission and reception of data by the first near field communication with the communication partners other than the communication partner that has transmitted the detection information.

According to this invention, while maintaining the establishment of a link between a communication apparatus of a reception side of detection information and each of a plurality of communication partners, transmission and reception of data by first near field communication with other communication partners not performing the first near field communication can be efficiently restricted in an arbitrary time zone.

The invention according to claim 2 is characterized by the communication apparatus according to claim 1, wherein, in a case where another detection information is received from a communication partner whose transmission and reception of data by the first near field communication is restricted, the communication partner different from the communication partner that has transmitted the detection information first, while maintaining the establishment of the link with each of the plurality of communication partners for which the link is established, the communication control unit removes restriction of the transmission and reception of the data with the communication partner that has transmitted the another detection information, and restricts transmission and reception of data by the first near field communication with the communication partners other than the communication partner whose restriction of the transmission and reception of data has been removed.

According to this invention, in a communication apparatus of a reception side of detection information, it is possible to switch quickly and efficiently a communication partner of which transmission and reception of data by the first near field communication is not restricted.

The invention according to claim 3 is characterized by the communication apparatus according to claim 1 or 2, wherein the communication control unit does not respond to a predetermined command by the first near field communication from the communication partner whose transmission and reception of data by the first near field communication is restricted.

According to this invention, in a communication apparatus of a reception side of detection information, even in a case where data indicating a predetermined command is received by the first near field communication from a communication partner whose transmission and reception of data by the first near field communication is restricted, transmission and reception of data by the first near field communication with the communication partner can be efficiently restricted by not responding to the command.

The invention according to claim 4 is characterized by the communication apparatus according to any one of claims 1 to 3, further comprising a battery that supplies power to each unit included in the communication apparatus, wherein, in a case where a state in which the first near field communication is not performed with any of the plurality of communication partners for which the link is established continues for a predetermined time, while maintaining establishment of the link with each of the plurality of communication partners for which the link is established, the communication control unit switches a power consumption mode of the battery from a normal mode to a power saving mode, and thereafter, in a case where the detection information from any one of the plurality of communication partners for which the link is established is received, the communication control unit switches the power consumption mode of the battery from the power saving mode to the normal mode, and restricts transmission and reception of data by the first near field communication with the communication partners other than the communication partner that has transmitted the detection information.

According to this invention, in a communication apparatus of a reception side of detection information, while preventing the power consumption of a battery, transmission and reception of data by first near field communication with other communication partners not performing the first near field communication can be efficiently restricted in an arbitrary time zone.

The invention according to claim 5 is characterized by the communication apparatus according to claim 4, wherein, in a case where the state in which the first near field communication is not performed with any of the plurality of communication partners for which the link is established continues for the predetermined time, while maintaining establishment of the link with each of the plurality of communication partners for which the link is established, the communication control unit switches a power consumption mode of the battery from a normal mode to a power saving mode, and removes the restriction with all the communication partners whose transmission and reception of data by the first near field communication has been restricted.

According to this invention, in a communication apparatus of a reception side of detection information, it is possible to efficiently reset the restriction of transmission and reception of data by the first near field communication.

The invention according to claim 6 is characterized by the communication apparatus according to any one of claims 1 to 5, wherein each of the communication partners broadcasts the detection information including identification information acquired from the detected portable storage medium to the plurality of communication apparatus for which the link is established by the first near field communication, the communication apparatus further comprises a memory that stores identification information corresponding to the communication apparatus, and only in a case where the broadcasted detection information is received, and the identification information included in the detection information matches the identification information stored in the memory, while maintaining establishment of the link with each of the plurality of communication partners for which the link is established, the communication control unit restricts transmission and reception of data by the first near field communication with the communication partners other than the communication partner that has transmitted the detection information.

According to this invention, even in a case where the communication apparatus of a transmission side of detection information cannot specify one communication partner from identification information acquired from a portable storage medium, transmission and reception of data by the first near field communication with another communication partner not performing the first near field communication can be quickly restricted.

The invention according to claim 7 is characterized by the communication apparatus according to any one of claims 1 to 5, wherein each of the communication partners unicasts the detection information to a communication apparatus corresponding to identification information acquired from the detected portable storage medium by the first near field communication, and in a case where the unicasted detection information is received, while maintaining establishment of the link with each of the plurality of communication partners for which the link is established, the communication control unit restricts transmission and reception of data by the first near field communication with the communication partners other than the communication partner that has transmitted the detection information.

According to this invention, in a communication apparatus of a reception side of detection information, transmission and reception of data by first near field communication with other communication partners not performing the first near field communication can be restricted more quickly.

The invention according to claim 8 is characterized by comprising: a first communication unit that establishes a link necessary for first near field communication with a communication partner existing in a first communicable range, and then performs the first near field communication with the communication partner for which the link is established; a second communication unit that performs second near field communication with a communication partner existing in a second communicable range narrower than the first communicable range; a detection unit that detects that a portable storage medium capable of the second near field communication has entered the second communicable range; and a communication control unit that, in a case where the detection unit detects that the portable storage medium has entered the second communicable range, causes the first communication unit to transmit detection information indicating that the portable storage medium has entered the second communicable range to at least one communication partner for which the link is established.

According to this invention, while maintaining the establishment of a link, to a communication apparatus of a reception side of detection information, between the communication apparatus and each of a plurality of communication partners, transmission and reception of data by first near field communication with other communication partners not performing the first near field communication can be efficiently restricted in an arbitrary time zone.

The invention according to claim 9 is characterized by the communication apparatus according to claim 8, wherein while maintaining establishment of the link with each of the plurality of communication partners for which the link is established, the communication control unit restricts transmission and reception of data by the first near field communication with communication partners other than a communication partner corresponding to the portable storage medium whose entrance to the second communicable range has been detected.

According to this invention, while maintaining the establishment of a link between a communication apparatus of a transmission side of detection information and each of a plurality of communication partners, transmission and reception of data by first near field communication with other communication partners not performing the first near field communication can be efficiently restricted in an arbitrary time zone.

The invention according to claim 10 is characterized by the communication apparatus according to claim 8 or 9, wherein, in a case where the detection unit detects that another portable storage medium has entered the second communicable range, the communication control unit causes the first communication unit to transmit detection information indicating that the portable storage medium has entered the second communicable range to at least one communication partner for which the link is established.

According to this invention, to a communication apparatus of a reception side of detection information, it is possible to switch quickly and efficiently a communication partner of which transmission and reception of data by the first near field communication is not restricted.

The invention according to claim 11 is characterized by the communication apparatus according to claim 10, wherein while maintaining establishment of the link with each of the plurality of communication partners for which the link is established, the communication control unit removes restriction of transmission and reception of the data with a communication partner corresponding to the another portable storage medium whose entrance to the second communicable range has been detected, and restricts transmission and reception of data by the first near field communication with communication partners other than the communication partner corresponding to the another portable storage medium.

According to this invention, in a communication apparatus of a transmission side of detection information, it is possible to switch quickly and efficiently a communication partner of which transmission and reception of data by the first near field communication is not restricted.

The invention according to claim 12 is characterized by the communication apparatus according to any one of claims 8 to 11, further comprising a battery that supplies power to each unit included in the communication apparatus, wherein, in a case where a state in which the first near field communication is not performed with any of the plurality of communication partners for which the link is established continues for a predetermined time, while maintaining establishment of the link with each of the plurality of communication partners for which the link is established, the communication control unit switches a power consumption mode of the battery from a normal mode to a power saving mode, and thereafter, in a case where it is detected that the portable storage medium has entered the second communicable range, the communication control unit switches the power consumption mode of the battery from the power saving mode to the normal mode, and restricts transmission and reception of data by the first near field communication with the communication partners other than the communication partner corresponding to the portable storage medium, whose entrance to the second communicable range has been detected.

According to this invention, in a communication apparatus of a transmission side of detection information, while preventing the power consumption of a battery, transmission and reception of data by first near field communication with other communication partners not performing the first near field communication can be efficiently restricted in an arbitrary time zone.

The invention according to claim 13 is characterized by the communication apparatus according to claim 12, wherein, in a case where the state in which the first near field communication is not performed with any of the plurality of communication partners for which the link is established continues for the predetermined time, while maintaining establishment of the link with each of the plurality of communication partners for which the link is established, the communication control unit switches a power consumption mode of the battery from a normal mode to a power saving mode, and removes the restriction with all the communication partners whose transmission and reception of data by the first near field communication has been restricted.

According to this invention, in a communication apparatus of a transmission side of detection information, it is possible to efficiently reset the restriction of transmission and reception of data by the first near field communication.

The invention according to claim 14 is characterized by the communication apparatus according to any one of claims 8 to 13, wherein the communication control unit causes the first communication unit to broadcast the detection information including identification information acquired from the detected portable storage medium to the plurality of communication partners for which the link is established.

According to this invention, in the communication apparatus of a transmission side of detection information, even in a case where one communication partner cannot be specified from the identification information acquired from the portable storage medium, corresponding one of the plurality of communication partners broadcasted can reply to inform that.

The invention according to claim 15 is characterized by the communication apparatus according to any one of claims 8 to 13, wherein the communication control unit causes the first communication unit to unicast the detection information to one communication partner identified by identification information acquired from the detected portable storage medium, the communication partner for which the link is established.

According to this invention, to a communication apparatus of a reception side of detection information, transmission and reception of data by first near field communication with other communication partners not performing the first near field communication can be restricted more quickly.

The invention according to claim 16 is characterized by a communication system comprising a plurality of communication apparatuses, comprising: a first communication apparatus comprising a first communication unit that establishes a link necessary for first near field communication with a communication partner existing in a first communicable range, and then performs the first near field communication with the communication partner for which the link is established, a second communication unit that performs second near field communication with a communication partner existing in a second communicable range narrower than the first communicable range, a detection unit that detects that a portable storage medium capable of the second near field communication has entered the second communicable range of the second communication unit, and a communication control unit that, in a case where the detection unit detects that the portable storage medium has entered the second communicable range, causes the first communication unit to transmit detection information indicating that the portable storage medium has entered the second communicable range to a second communication apparatus that is at least one communication partner for which the link is established; and the second communication apparatus comprising a communication unit that establishes a link necessary for first near field communication with a communication partner existing in the first communicable range, and then performs the first near field communication with the communication partner for which the link is established, and a communication control unit that, in a case where the detection information transmitted from the first communication apparatus, which is one of the plurality of communication partners for which the link is established, is received, while maintaining establishment of the link with each of the plurality of communication partners for which the link is established, restricts transmission and reception of data by the first near field communication with the communication partners other than the first communication apparatus that has transmitted the detection information.

The invention according to claim 17 is characterized by a communication method performed by a computer that establishes a link necessary for first near field communication with a plurality of communication partners existing in a first communicable range, and then performs the first near field communication with the communication partners for which the link is established, wherein, in a case where detecting a portable storage medium that has entered a second communicable range narrower than the first communicable range, each of the communication partners transmits detection information indicating that the portable storage medium has entered the second communicable range to the communication apparatus for which the link is established by the first near field communication, and the communication method comprises a step of receiving the detection information transmitted from any one of the plurality of communication partners for which the link is established, and a step of, in a case where the detection information is received, while maintaining establishment of the link with each of the plurality of communication partners for which the link is established, restricting transmission and reception of data by the first near field communication with the communication partners other than the communication partner that has transmitted the detection information.

The invention according to claim 18 is characterized by a communication method performed by a computer, an information processing method comprising: a step of establishing a link necessary for first near field communication with a communication partner existing in a first communicable range, and then performing the first near field communication with the communication partner for which the link is established; a step of performing second near field communication with a communication partner existing in a second communicable range narrower than the first communicable range; a step of detecting that a portable storage medium capable of the second near field communication has entered the second communicable range; and a step of, in a case where it is detected that the portable storage medium has entered the second communicable range, transmitting detection information indicating that the portable storage medium has entered the second communicable range to at least one communication partner for which the link is established by the first near field communication.

The invention according to claim 19 is characterized by a communication processing program for a computer that establishes a link necessary for first near field communication with a plurality of communication partners existing in a first communicable range, and then performs the first near field communication with the communication partner for which the link is established, wherein in a case where a portable storage medium that has entered a second communicable range narrower than the first communicable range is detected, each of the communication partners transmits detection information indicating that the portable storage medium has entered the second communicable range to the communication apparatus for which the link is established by the first near field communication, and the communication processing program causes the computer to function as a communication control unit that, in a case where the detection information transmitted from any one of the plurality of communication partners for which the link is established is received, while maintaining establishment of the link with each of the plurality of communication partners for which the link is established, restricts transmission and reception of data by the first near field communication with the communication partners other than the communication partner that has transmitted the detection information.

The invention according to claim 20 is characterized by a communication processing program that causes a computer comprising: a first communication unit that establishes a link necessary for first near field communication with a communication partner existing in a first communicable range, and then performs the first near field communication with the communication partner for which the link is established; and a second communication unit that performs second near field communication with a communication partner existing in a second communicable range narrower than the first communicable range to function as a detection unit that detects that a portable storage medium capable of the second near field communication has entered the second communicable range; and a communication control unit that, in a case where the detection unit detects that the portable storage medium has entered the second communicable range, transmits detection information indicating that the portable storage medium has entered the second communicable range to at least one communication partner for which the link is established by the first near field communication.

Effects of the Invention

According to the present invention, while maintaining establishment of a link between a specific communication apparatus and each of a plurality of communication partners, transmission and reception of data by first near field communication of other communication partners that do not perform near field communication can be efficiently limited in an arbitrary time zone.

BRIEF DESCRIPTION OF THE DRAWINGS

FIG. 3 is a figure illustrating an example of functional blocks of a control unit 7.

FIG. 4(A) is a figure illustrating an example of a communication partner list of the control unit 7 of a communication apparatus CM1, and FIG. 4(B) is a figure illustrating an example of the communication partner list of the control unit 7 of the communication apparatus CS1.

FIGS. 5A and 5B are figures illustrating an example of update of the communication partner list of the control unit 7 of the communication apparatus CM1.

FIG. 6 is a sequence figure illustrating an example of basic operation of the communication system S in a case where detection information is broadcasted.

FIG. 7 is a sequence figure illustrating an example of basic operation of the communication system S in a case where detection information is unicasted.

FIG. 8 is a flowchart illustrating an example of power supply restriction processing in the control unit 7 of the communication apparatus C.

FIG. 10 is a conceptual figure illustrating an example of the inside of a store.

EMBODIMENTS FOR CARRYING OUT THE INVENTION

Hereinafter, embodiments of the present invention will be described with reference to the figures. The embodiment described below is an embodiment in a case where the present invention is applied to a communication system in which one communication apparatus can perform near field communication with each of a plurality of communication apparatuses.

[1. Overview of Communication System S]

Figure 1:
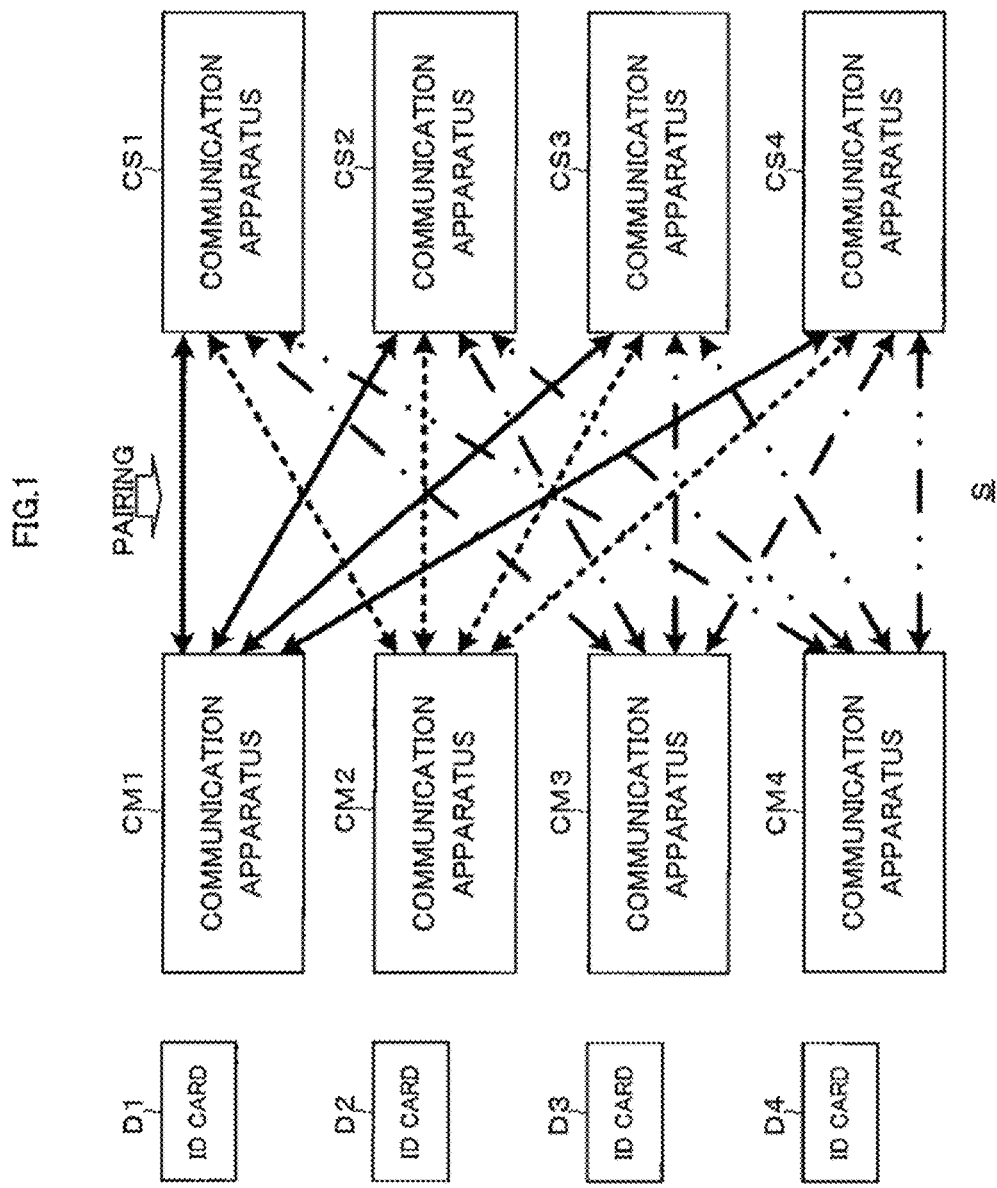
FIG. 1 is a figure illustrating an example of a schematic configuration of a communication system S.

First, referring to FIG. 1, the outline of the communication system S will be described. FIG. 1 is a figure illustrating an example of a schematic configuration of the communication system S. In the example of FIG. 1, the communication system S comprises communication apparatuses CMn (n=1, 2, 3, 4), communication apparatuses CSm (m=1, 2, 3, 4), ID cards Dk (l=1, 2, 3, 4), and the like. The communication apparatus CMn is an example of a first communication apparatus in the present invention, and the communication apparatus CSm is an example of a second communication apparatus in the present invention. Note that the communication apparatus CMn and the communication apparatus CSm are collectively referred to as a communication apparatus C. The number of communication apparatuses C and the ID card Dk is not particularly limited. Furthermore, the communication partner of the communication apparatus CMn is the communication apparatus CSm, and the communication partner of the communication apparatus CSm is the communication apparatus CMn. The ID card Dk is an example of a portable storage medium.

The communication apparatus CMn adopts a plurality of types of near field communication methods having different communicable ranges (in other words, communicable distances). For example, the communication apparatus C adopts a near field communication (hereinafter referred to as "first near field communication") method based on BT, and a near field communication (hereinafter referred to as "second near field communication (non-contact proximity communication)") method based on NFC. Note that the communication apparatus CSm may not adopt the second near field communication method. The first near field communication method is a wireless communication technology using a 2.4 GHz band, and the communicable distance (maximum) thereof is set between 10 m and 100 m (for example, set to about 10 m). In the first near field communication method, for example, 79 channels having a frequency bandwidth of 1 MHz are set, and a frequency hopping spread spectrum technique of switching the channels 1600 times per second is adopted. On the other hand, the second near field communication method is a wireless communication (non-contact proximity communication) technology (one type of radio frequency identification (RFID) technology) using 13.56 MHz band, and the communicable distance (maximum) thereof is about several cm. Therefore, the communicable range based on NFC (hereinafter, referred to as "second communicable range") is narrower than the communicable range based on BT (hereinafter, referred to as "first communicable range").

Note that the ID card Dk is a non-contact IC card on which an antenna and an IC chip are mounted, and can perform second near field communication with the communication apparatus CMn. Identification information corresponding to the communication apparatus CSm is stored in the non-volatile memory of the IC chip. For example, identification information corresponding to the communication apparatus CS1 is stored in the ID card D1, identification information corresponding to the communication apparatus CS2 is stored in the ID card D2, identification information corresponding to the communication apparatus CS3 is stored in the ID card D3, and identification information corresponding to the communication apparatus CS4 is stored in the ID card D4.

The communication apparatus CMn corresponds to a master apparatus in the first near field communication method. On the other hand, the communication apparatus CSm corresponds to a slave apparatus in the first near field communication method. The communication apparatus CMn determines the frequency hopping pattern according to the processing content, and the communication apparatus CSm is controlled by the communication apparatus CMn (that is, the master apparatus has the initiative of the first near field communication). In the example of FIG. 1, each communication apparatus CMn establishes a link by pairing with each communication apparatus CSm (multipoint-connected), and performs the first near field communication with the communication apparatuses CSm existing in the first communicable range. In the present embodiment, it is assumed that at least two or more communication apparatuses CSm exist (that is, are included) in the first communicable range of one communication apparatus CMn. For example, the communication apparatus CM1 establishes the above-described link (that is, the link necessary for the first near field communication) with each of the communication apparatuses CS1 to CS4. Then, for example, in a case where the communication apparatuses CS1, CS2, and CS3 among the communication apparatuses CS1 to CS4 exist in the first communicable range of the communication apparatus CM1, the communication apparatus CM1 can perform first near field communication simultaneously with each of the communication apparatuses CS1, CS2, and CS3.

Furthermore, the communication apparatus CMn performs second near field communication (non-contact proximity communication) with the ID card Dk existing in the second communicable range. In the present embodiment, it is assumed that one ID card Dk enters the second communicable range of one communication apparatus CMn. For example, in a case where the communication apparatus CM1 detects that the ID card D1 has entered the second communicable range, the communication apparatus CM1 transmits the detection information indicating that the ID card D1 has entered the second communicable range to the communication apparatus CS1 corresponding to the ID card D1 by the first near field communication. At this time, while maintaining the establishment of the link with each of the communication apparatuses CS1 to CS4 for which the above-described link is established, the communication apparatus CM1 restricts transmission and reception of data by the first near field communication with communication apparatuses CS2 to CS4 other than the communication apparatus CS1 corresponding to the ID card D1, whose entrance to the second communicable range has been detected. For example, communication restriction setting is performed in which the communication apparatuses CS2 to CS4 are set as communication restriction partners.

Then, in a case where the communication apparatus CS1 receives detection information transmitted from the communication apparatus CM1 among the communication apparatuses CM1 to CM4 for which the above-described link is established, while maintaining the establishment of the link with each of the communication apparatuses CM1 to CM4 for which the link is established, the communication apparatus CS1 restricts transmission and reception of data by the first near field communication with communication apparatuses CM2 to CM4 other than the communication apparatus CM1 that has transmitted the detection information. For example, communication restriction setting is performed in which the communication apparatuses CM2 to CM4 are set as communication restriction partners. As a result, it is possible to perform the first near field communication only between two specific communication apparatuses CM1 and CS1 in an arbitrary time zone.

Here, examples of "restricting transmission and reception of data by the first near field communication" include not transmitting regular data to the communication restriction partner by the first near field communication. The regular data is data necessary for processing in the communication apparatus C (in other words, regular data is data for causing the processing to proceed normally), and is data other than the detection information. Examples of the regular data in this case include command data (data indicating a predetermined command) for the communication partner. There is a case where data to be processed (for example, data before or after processing) may be included in the command data. As a result, for example, the communication apparatus CM1 transmits command data by the first near field communication only to the communication apparatus CS1 existing in the first communicable range. In other words, even in a case where the communication apparatuses CS2 to CS4, which are communication restriction partners, exist in the first communicable range, the communication apparatus CM1 does not transmit command data to the communication restriction partners by the first near field communication. Note that examples of non-regular data include error message data, of which transmission and reception by the first near field communication may not be restricted.

Furthermore, another example of "restricting transmission and reception of data by the first near field communication" is not-receiving regular data transmitted from the communication restriction partner by the first near field communication. "Not receiving the regular data" means, for example, that an application (software) installed on the communication apparatus C does not receive (or discards) the regular data. Examples of the regular data in this case include command data from the communication restriction partner. As a result, for example, even in a case where the communication apparatus CS1 receives command data from the communication apparatuses CM2 to CM4, which are communication restriction partners, by the first near field communication (received by the near field communication function based on BT), the communication apparatus CS1 does not respond to the command and does not send back response data to the command (or sends back error message data indicating that the communication apparatus CS1 cannot respond to the command). In other words, the communication apparatus CS1 performs processing according to the command only in a case where the command data is received from the communication apparatus CM1 that is not the communication restriction partner by the first near field communication, and sends back response data to the command (for example, response data indicating the processing result). As a result, the communication apparatus CS1 can efficiently restrict transmission and reception of data by the first near field communication with the communication apparatuses CM2 to CM4 which are communication restriction partners.

Note that, after establishment of the link by pairing, in a case where a logical communication path (connection) is established before transmission and reception of data by the first near field communication, "restricting transmission and reception of data by the first near field communication" may be rejection of establishment of the logical communication path.

In addition, in a case where the communication apparatus CM1 detects that the another ID card D2 (that is, the ID card D2 different from the ID card D1) has entered the second communicable range, the communication apparatus CM1 transmits the detection information indicating that the ID card D2 has entered the second communicable range to the communication apparatus CS2 corresponding to the ID card D1 by the first near field communication. At this time, while maintaining the establishment of the link with each of the communication apparatuses CS1 to CS4 for which the above-described link is established, the communication apparatus CM1 removes restriction of transmission and reception of data with the communication apparatus CS2 corresponding to the ID card D2, whose entrance to the second communicable range has been detected, and restricts transmission and reception of data by the first near field communication with communication apparatuses CS1 and CS3 to CS4 other than the communication apparatus CS2 corresponding to the ID card D2. As a result, the communication apparatus CM1 can switch quickly and efficiently a communication partner whose transmission and reception of data by the first near field communication is not restricted.

Then, in a case where the communication apparatus CS2 receives detection information transmitted from the communication apparatus CM1, while maintaining the establishment of the above-described link with each of the communication apparatuses CM1 to CM4 for which the link is established, the communication apparatus CS1 restricts transmission and reception of data by the first near field communication with communication apparatuses CM2 to CM4 other than the communication apparatus CM1 that has transmitted the detection information. Note that, in a case where in the communication apparatus CS2, the communication restriction setting has already been performed when the detection information transmitted from the communication apparatus CM1 is received, while maintaining the establishment of the link with each of the communication apparatuses CM1 to CM4 for which the above-described link is established, the communication apparatus CS2 removes the restriction of transmission and reception of data with the communication apparatus CM1 (for example, removes the communication restriction setting of the communication apparatus CM1), and restricts transmission and reception of data by the first near field communication with the communication apparatuses CM2 to CM4 other than the communication apparatus CM1 whose restriction of transmission and reception of data is removed.

On the other hand, in a case where the communication apparatus CS1 that has already received the detection information from the communication apparatus CM1 receives another detection information from the communication apparatus CM2 set as the communication restriction partner (the communication partner different from the communication partner that has transmitted the detection information first), while maintaining the establishment of the link with each of the communication apparatuses CM1 to CM4 for which the above-described link is established, the communication apparatus CS1 removes the restriction of transmission and reception of data with the communication apparatus CM2 that has transmitted another detection information, and restricts transmission and reception of data by the first near field communication with the communication apparatuses CM1 and CM3 to CM4 other than the communication apparatus CM2 whose restriction of transmission and reception of data is removed.

[2. Configuration and Function of Communication Apparatus C]

Figure 2:
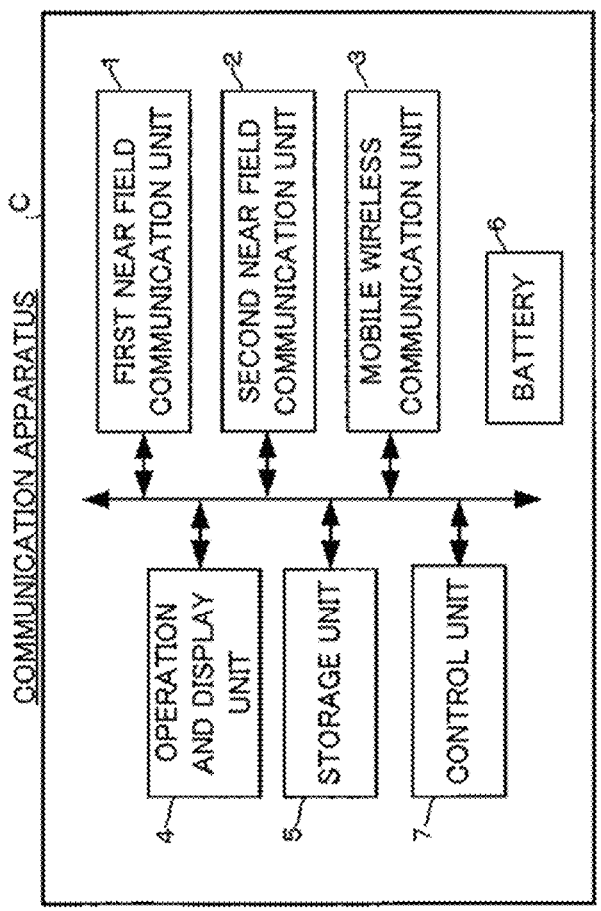
FIG. 2 is a figure illustrating an example of a schematic configuration of a communication apparatus C.

Next, referring to FIG. 2 or the like, the configuration and function of the communication apparatus C will be described. FIG. 2 is a figure illustrating an example of a schematic configuration of the communication apparatus C.

As illustrated in FIG. 2, the communication apparatus C comprises a first near field communication unit 1, a second near field communication unit 2, a mobile wireless communication unit 3, an operation and display unit 4, a storage unit 5, a battery 6, a control unit 7 that controls each of these units, and the like. Note that the communication apparatus C may comprise an audio processing unit 4 and a speaker. The first near field communication unit 1 is an example of a first communication unit in the present invention, and the second near field communication unit 2 is an example of the first communication unit in the present invention. Note that the communication apparatus CSm may not comprise the second near field communication unit 2.

The first near field communication unit 1 is connected to an antenna (not illustrated) for the first near field communication, and in the first near field communication unit 1, an apparatus address unique to each of the first near field communication unit 1 of each communication apparatus C is stored in advance. The first near field communication unit 1 has a near field communication function based on BT, establishes a link by pairing with the first near field communication unit 1 of the communication partner existing in the first communicable range, and then performs the first near field communication with the first near field communication unit 1 of the communication partner for which the link is established.

In this pairing, authentication information (such as a public key) of each other is exchanged between the first near field communication units 1 of both the communication apparatus CMn and the communication apparatus CSm so that the mutual authentication is performed, and when the mutual authentication is successful, a shared key (link key or long term key) is generated. Then, the generated shared key is stored (bonded) in the first near field communication units 1 of both the communication apparatus CMn and the communication apparatus CSm. At this time, the apparatus address of the first near field communication unit 1 of the communication partner is stored in association with a common key in the first near field communication units 1 of both. The shared key thus stored is used to encrypt or decrypt data of the packet (data in the payload portion of the packet) transmitted in the first near field communication after pairing. A common profile (which defines the protocol of the first near field communication) is stored in the first near field communication units 1 of both the communication apparatus CMn and the communication apparatus CSm to be paired. Examples of such profiles include Generic Access Profile (GAP), File Transfer Profile (FTP), Generic ATTribute profile (GATT) and the like.

The second near field communication unit 2 is connected to an antenna (not illustrated) for the second near field communication. The second near field communication unit 2 has a near field communication function based on NFC, and performs second near field communication (non-contact proximity communication) with a second near field communication unit 2 of a communication partner existing in a second communicable range narrower than the first communicable range. In the present embodiment, the second near field communication unit 2 is set to a reader/writer mode operating as a non-contact IC card reader. For example, in a case where the ID card Dk enters the second communicable range of the communication apparatus CMn, the second near field communication unit 2 of the communication apparatus CMn detects the ID card Dk, and transmits request data (modulated wave) to the ID card Dk, so as to read out the identification information stored in the ID card Dk (that is, the identification information corresponding to the communication apparatus CSm), and acquire the identification information. Then, for example, identification information acquired by the second near field communication unit 2 of the communication apparatus CMn is output to the control unit 7 of the communication apparatus CMn. Note that, examples of the identification information corresponding to the communication apparatus CSm include the user ID of the user of the ID card Dk, and the device address of the first near field communication unit 1 of the communication apparatus CSm. However, the identification information corresponding to the communication apparatus CSm may be other information such as the MAC address of the communication apparatus CSm, as long as the information can uniquely identify the communication apparatus CSm.

The mobile wireless communication unit 3 is connected to an antenna (not illustrated) for mobile wireless communication. The mobile wireless communication unit 3 has a wireless communication function using a mobile communication network. The mobile communication network includes, for example, a telephone circuit switched network and a data communication packet switched network for connecting to the Internet. The mobile wireless communication unit 3 performs wireless communication with the nearest base station via an antenna (not illustrated), and communicates with a predetermined server via the base station and the mobile communication network.

The operation and display unit 4 comprises an input function for accepting an operation instruction by a finger of a user of the communication apparatus C, a pen, or the like and a touch panel having a screen for displaying information. The operation and display unit 4 accepts an operation instruction from the user, and outputs an operation instruction signal according to the operation instruction to the control unit 7.

The storage unit 5 comprises, for example, a non-volatile memory, and stores an operating system (OS), an application, and the like. The application is an application instance installed in an executable state by developing an application program (including the communication processing program of the present invention) or the like in a memory. Note that the application program may be downloaded to the communication apparatus C from a predetermined server, or may be recorded (recorded readably by a computer) on a recording medium such as a CD or DVD so as to be read from the recording medium and stored in the storage unit 6.

The battery 6 is a power supply of the communication apparatus C, and can charge the power for operating the communication apparatus C from the outside. The battery 6 supplies power to each unit of the communication apparatus C under the control of the control unit 7. Note that the battery 6 can switch the power consumption mode from the normal mode to the power saving mode under the control of the control unit 7. In the power saving mode, for example, the brightness of the screen in the operation and display unit 4 is set to be darker than in the normal mode, and the time until the sleep state is set to be shorter than in the normal mode. Note that, in the power saving mode, functions other than the near field communication function based on BT may be locked.

The control unit 7 comprises a central processing unit (CPU), a read only memory (ROM), a random access memory (RAM), and the like. The control unit 7 (processor in the control unit 7) functions as a processing unit 71, a proximity communication detection unit 72, a communication control unit 73, and the like according to an application executed on the OS. Furthermore, the control unit 7 performs on and off control of the power supply of the battery 6 (that is, on and off control of the power). FIG. 3 is a figure illustrating an example of functional blocks of the control unit 7. Note that the proximity communication detection unit 72 is an example of a detection unit in the present invention, and the communication control unit 73 is an example of a communication control unit in the present invention. Note that the second near field communication unit 2 may be a detection unit in the present invention. Furthermore, the communication apparatus CSm may not comprise the proximity communication detection unit 72.

The processing unit 71 performs predetermined processing according to the operation instruction signal from the operation and display unit 4, or according to the data (for example, command data or response data) received by the first near field communication unit 1, the second near field communication unit 2, or the mobile wireless communication unit 3. Note that the data received by the first near field communication unit 1, the second near field communication unit 2, or the mobile wireless communication unit 3 is output to the processing unit 71 via the communication control unit 73. Furthermore, the data processed by the processing unit 71 is output to the first near field communication unit 1, the second near field communication unit 2, or the mobile wireless communication unit 3 via the communication control unit 73.

The near field communication detection unit 72 acquires the identification information from the second near field communication unit 2 to detect that the ID card Dk has entered the second communicable range. Note that the identification information acquired by the proximity communication detection unit 72 is passed to the communication control unit 73.

The communication control unit 73 controls transmission and reception of data by each of the first near field communication unit 1, the second near field communication unit 2, and the mobile wireless communication unit 3. The communication control unit 73 can perform control such as performing pairing, removing pairing (deletion of a shared key generated by pairing), on and off of a near field communication function based on BT, and on and off of a near field communication function based on NFC, according to an operation instruction signal from the operation and display unit 4.

Furthermore, in a case where the proximity communication detection unit 72 detects that the ID card Dk has entered the second communicable range, the communication control unit 73 of the communication apparatus CMn causes the first near field communication unit 1 to transmit detection information indicating that the ID card Dk has entered to the second communicable range to at least one communication partner for which the above-described link is established. For example, the communication control unit 73 of the communication apparatus CMn causes the first near field communication unit 1 to broadcast the detection information including the identification information acquired from the detected ID card Dk to the plurality of communication partners for which the above-described link is established. That is, the identification information acquired from the ID card Dk is, for example, the user ID of the user of the ID card Dk, and it is not possible to specify one communication partner from this user ID, so that the detection information is broadcasted to the plurality of communication partners. As a result, the communication control unit 73 of the communication apparatus CMn receives confirmation information returned from the communication partner corresponding to the identification information included in the detection information among the plurality of communication partners that has received the detection information. On the other hand, in a case where the identification information acquired from the ID card Dk is a device address capable of specifying one communication partner, the communication control unit 73 of the communication apparatus CMn causes the first near field communication unit 1 to unicast the detection information indicating that the ID card Dk has entered the second communicable range to one communication partner for which the above-described link is established, the communication partner specified by the identification information acquired from the detected ID card Dk.

Furthermore, in a case where the proximity communication detection unit 72 detects that the ID card Dk has entered the second communicable range, while maintaining the establishment of the link with each of a plurality of communication partners for which the above-described link is established (that is, maintaining the establishment of the link by not removing the pairing), the communication control unit 73 of the communication apparatus CMn restricts transmission and reception of data by the first near field communication with a communication partner other than the communication partner corresponding to the ID card Dk whose entrance to the second communicable range has been detected (that is, the communication partner corresponding to the identification information acquired from the ID card Dk). For example, the communication control unit 73 of the communication apparatus CMn performs communication restriction setting for setting the communication restriction partner using the communication partner list for registering the information of the communication partner for which the above-described link is established, and the identification information acquired from the ID card Dk through the second near field communication unit 2. Such a communication partner list is stored, for example, in the RAM of the control unit 7.

On the other hand, in a case where the first near field communication unit 1 receives the detection information transmitted from any one of the plurality of communication partners for which the above-described link is established, while maintaining the establishment of the link with each of the plurality of communication partners for which the above-described link is established, the communication control unit 73 of the communication apparatus CSm restricts transmission and reception of data by the first near field communication with communication partners other than the communication partner that has transmitted the detection information. For example, in a case where the detection information broadcasted from the communication apparatus CMn is received, the communication control unit 73 of the communication apparatus CSm determines whether or not the identification information included in the detection information matches, for example, the identification information stored in a predetermined region of a memory such as a RAM due to logging in to the application (the identification information corresponding to the communication apparatus CSm). Then, in a case where the identification information included in the detection information matches the identification information stored in the above-described memory (that is, in a case where the detection information is addressed to itself), the communication control unit 73 of the communication apparatus CSm causes the first near field communication unit 1 to send back confirmation information indicating a match of the identification information to the communication apparatus CMn that has transmitted the detection information. In addition, only in the case where the identification information matches, while maintaining the establishment of the link with each of the plurality of communication partners for which the above-described link is established, the communication control unit 73 of the communication apparatus CSm restricts transmission and reception of data by the first near field communication with communication partners other than the communication partner that has transmitted the detection information. On the other hand, in a case where the detection information unicasted from the communication apparatus CMn is received, while maintaining the establishment of the above-described link with each of the plurality of communication partners for which the link is established, the communication control unit 73 of the communication apparatus CSm restricts transmission and reception of data by the first near field communication with communication partners other than the communication partner that has transmitted the detection information. For example, the communication control unit 73 of the communication apparatus CSm performs communication restriction setting for setting the communication restriction partner using the communication partner list for registering the information of the communication partner for which the above-described link is established, and the identification information corresponding to the communication partner that has transmitted the detection information.

FIG. 4(A) is a figure illustrating an example of the communication partner list of the control unit 7 of the communication apparatus CM1, and FIG. 4(B) is a figure illustrating an example of the communication partner list of the control unit 7 of the communication apparatus CS1. In the communication partner list illustrated in FIG. 4(A), the identification information (for example, a device address) corresponding to each of the communication apparatuses CS1 to CS4 for which the link is established with the communication apparatus CM1, and the communication restriction presence and absence value are associated with each other and registered. The identification information registered in the communication partner list is acquired at the time of pairing. In the communication partner list illustrated in FIG. 4(A), the communication apparatuses CS2 to CS4 are subjected to the communication restriction setting as communication restriction partners (communication restriction presence and absence value=1 (presence)). That is, in this example, the communication control unit 73 of the communication apparatus CM1 performs communication restriction setting by setting the communication restriction presence and absence value associated with identification information other than the identification information corresponding to the communication apparatus CS1 to "1". On the other hand, in the communication partner list illustrated in FIG. 4(B), the identification information corresponding to each of the communication apparatuses CM1 to CM4 for which the above-described link is established with the communication apparatus CS1, and the communication restriction presence and absence value are associated with each other and registered. In the communication partner list illustrated in FIG. 4(B), the communication apparatuses CM2 to CM4 are subjected to the communication restriction setting as communication restriction partners (communication restriction presence and absence value=1 (presence)). That is, in this example, the communication control unit 73 of the communication apparatus CS1 performs communication restriction setting by setting the communication restriction presence and absence value associated with identification information other than the identification information corresponding to the communication apparatus CM1 that has transmitted the detection information to "1".

Furthermore, in a case where the proximity communication detection unit 72 detects that the ID card Dk has entered the second communicable range after the communication restriction setting, the communication control unit 73 of the communication apparatus CMn transmits, by the first near field communication, detection information indicating that another ID card Dk has entered to the second communicable range to at least one communication partner for which the above-described link is established. Furthermore, while maintaining the establishment of the above-described link with each of a plurality of communication partners (including communication restriction partners) for which the link is established, the communication control unit 73 of the communication apparatus CMn removes the restriction of data transmission and reception of data with the communication partner corresponding to another ID card Dk whose entrance to the second communicable range has been detected (that is, removes the communication restriction setting for the communication restriction partner), and restricts the transmission and reception of data by the first near field communication with a communication partner other than the communication partner corresponding to another ID card Dk. For example, the communication control unit 73 of the communication apparatus CMn updates the communication restriction setting using the communication partner list.

On the other hand, in the communication apparatus CSm, in a case where another detection information is received by the first near field communication from the communication restriction partner different from the communication partner that has transmitted the detection information first, while maintaining the establishment of the above-described link with each of the plurality of communication partners for which the link is established, the communication control unit 73 of the communication apparatus CSm removes the restriction of transmission and reception of data with the communication restriction partner that has transmitted another detection information later, and restricts transmission and reception of data by the first near field communication with communication partners other than the communication apparatus whose restriction is removed.

FIGS. 5A and 5B are figures illustrating an example of update of the communication partner list of the control unit 7 of the communication apparatus CS1. As illustrated in FIG. 5(B), the communication restriction setting is updated in the communication partner list illustrated in FIG. 5(A). That is, in this example, the communication control unit 73 of the communication apparatus CS1 updates the communication restriction setting by changing the communication restriction presence and absence value "1" associated with the identification information corresponding to the communication apparatus CM2 that has transmitted the detection information later to "0" (that is, removes the control), and setting the communication restriction presence and absence value associated with identification information other than the identification information corresponding to the communication apparatus CM2 to "1". Note that this update includes one in which the communication restriction presence and absence value is maintained at "1", such as the communication apparatuses CM3 and CM4.

Then, when transmitting data by the first near field communication, the communication control unit 73 specifies identification information corresponding to a communication partner whose communication restriction is not set from the communication partner list (for example, the device address of the first near field communication unit 1 of the communication partner), and outputs the above-described data and the specified identification information to the first near field communication unit 1. As a result, the first near field communication unit 1 packetizes the data output from the communication control unit 73, sets the identification information output from the communication control unit 73 as the destination of the header portion of the packet, sets the identification information of the communication apparatus C which is the transmission source as the transmission source of the header portion, and transmits to the communication partner for which the above-described link is established and existing in the first communicable range. In this case, the data in the payload portion of the packet transmitted by the first near field communication unit 1 is encrypted by the shared key associated with the identification information output from the communication control unit 73 and transmitted.

On the other hand, in a case where the data of the packet received by the first near field communication unit 1 is input, the communication control unit 73 determines whether the transmission source of the data is the communication restriction partner on the basis of the communication partner list. In other words, it is determined whether the communication partner corresponding to the identification information set as the transmission source of the header portion of the packet is set for communication restriction. For example, in the communication partner list, in a case where the communication restriction presence and absence value "1" is associated with the identification information set as the transmission source of the header portion of the packet, it is determined that the communication partner is set for communication restriction. In this case, the communication control unit 73 does not pass the received packet data to the processing unit 71, and performs error processing (for example, discarding the data). On the other hand, in a case where the communication control unit 73 determines that the communication partner is not set for communication restriction, the communication control unit 73 passes the data of the received packet to the processing unit 71 for processing.

Note that the communication control unit 73 measures, by using a timer, the duration of the state in which the first near field communication is not performed with any of the plurality of communication partners for which the above-described link is established, and in a case where the state where the first near field communication is not performed continues for a predetermined time, while maintaining the establishment of the above-described link with each of the plurality of communication partners for which the link is established, the communication control unit 73 may switch the power consumption mode of the battery 6 from the normal mode to the power saving mode (power supply restriction). At this time, in a case where the communication restriction setting is made for any of the plurality of communication partners for which the above-described link is established, the communication control unit 73 may reset the communication restriction setting. Thus, after the power consumption mode of the battery 6 is switched to the power saving mode, in a case where the proximity communication detection unit 72 detects that the ID card Dk has entered the second communicable range, the communication control unit 73 of the communication apparatus CMn switches the power consumption mode of the battery 6 from the power saving mode to the normal mode, and restricts transmission and reception of data by the first near field communication with a communication partner other than the communication partner corresponding to the ID card Dk whose entrance to the second communicable range has been detected. On the other hand, after the power consumption mode of the battery 6 is switched to the power saving mode, in a case where detection information from any one communication partner among a plurality of communication partners for which the above-described link is established is received, the communication control unit 73 of the apparatus CSm switches the power consumption mode of the battery 6 from the power saving mode to the normal mode, and restricts transmission and reception of above-described data by the first near field communication with a communication partner other than the communication partner that has transmitted the detection information.

[3. Basic Operation of Communication System S]

Next, referring to FIGS. 6 and 7, the basic operation of the communication system S will be described. FIG. 6 is a sequence figure illustrating an example of basic operation of the communication system S in a case where detection information is broadcasted. FIG. 7 is a sequence figure illustrating an example of basic operation of the communication system S in a case where detection information is unicasted. In the example of FIGS. 6 and 7, each of the communication apparatuses CM1 and CM2 establishes a link by pairing with each of the communication apparatuses CS1 to CS4. Furthermore, it is assumed that the communication apparatuses CS1 to CS4 exist at positions away from the communication apparatuses CM1 and CM2 (for example, positions away from several to several tens of meters). Note that, although illustration of the communication apparatuses CM3 and CM4 is omitted, each of the communication apparatuses CM3 and CM4 establishes a link by pairing with each of the communication apparatuses CS1 to CS4.

(Operation Example Illustrated in FIG. 6)

First, in the example of FIG. 6, by logging in to the application activated in each of the communication apparatuses CS1 to CS4, the user ID is stored as identification information corresponding to each in a predetermined region (for example, a storage region for holding login information) of the memory of the communication apparatuses CS1 to CS4 (steps S11, S21, S31, S41). For example, the user ID "U001" of the user of the communication apparatus CS1 is stored in the communication apparatus CS1, and the user ID "U002" of the user of the communication apparatus CS2 is stored in the communication apparatus CS2. In the example of FIG. 6, the user ID "U001" of the user of the communication apparatus CS1 is stored in advance as identification information in the ID card D1, and the user ID "U002" of the user of the communication apparatus CS2 is stored in advance as identification information in the ID card D2.

Thereafter, in a case where the communication apparatus CM1 and the ID card D1 are brought into proximate with each other to enters the second communicable range of each other, the second near field communication unit 2 of the communication apparatus CM1 detects the ID card D1 to establish the non-contact proximity communication, and transmits request data to the ID card D1, so as to read the identification information stored in the ID card D1 (for example, the user ID "U001"), and acquire the identification information. As a result, the proximity communication detection unit 72 of the communication apparatus CM1 acquires the identification information from the second near field communication unit 2 (for example, the user ID "U001"), and detects that the ID card D1 has entered the second communicable range (step S1).

Next, the communication control unit 73 of the communication apparatus CM1 causes the first near field communication unit 1 to broadcast detection information including identification information (for example, the user ID "U001") acquired from the ID card D1 detected in step S1 to the communication apparatuses CS1 to CS4 for which the above-described link is established. The detection information thus broadcasted is received by the first near field communication of the communication apparatuses CS1 to CS4. Then, the communication control unit 73 of each of the communication apparatuses CS1 to CS4 determines whether or not the identification information included in the received detection information matches the identification information stored due to login (steps S12, S22, S32, S42).

Here, since the identification information included in the detection information matches the identification information stored due to login, the communication control unit 73 of the communication apparatus CS1 causes the first near field communication unit 1 to send back the confirmation information indicating a match of the identification information to the communication apparatus CM1 that has transmitted the detection information. In the confirmation information, the device address of the first near field communication unit 1 of the communication apparatus CS1 is included as the information of the transmission source. On the other hand, the communication apparatuses CS2 to CS4 do not transmit the confirmation information because the identification information included in the detection information does not match the identification information stored due to login.

Next, while maintaining the establishment of the above-described link with each of the communication apparatuses CM1 to CM4, the communication control unit 73 of the communication apparatus CS1 sets the communication apparatuses CM2 to CM4 as the communication restriction partners using the device address of the first near field communication unit 1 of the communication apparatus CM1 that has transmitted the detection information, and the communication partner list (step S13).

On the other hand, when the communication control unit 73 of the communication apparatus CM1 receives the confirmation information sent back from the communication apparatus CS1 by the first near field communication, while maintaining the establishment of the above-described link with each of the communication apparatuses CS1 to CS4, the communication control unit 73 sets the communication apparatuses CS2 to CS4 as the communication restriction partner (performs communication restriction setting) using the device address included in the confirmation information (that is, the device address of the first near field communication unit 1 of the communication apparatus CS1) and the communication partner list (step S2). Such communication restriction setting is maintained even in a case where the communication apparatus CM1 and the communication apparatus CS1 go out of the second communicable range of each other.

Thereafter, in a case where the processing unit 71 of the communication apparatus CM1 performs predetermined processing (not illustrated) according to the operation instruction signal or the like, and transmits data (for example, command data) according to the processing by the first near field communication, the communication control unit 73 of the communication apparatus CM1 specifies the communication apparatus CS1 from the communication partner list as a communication partner whose communication restriction is not set (step S3). The identification information corresponding to the communication apparatus CS1 thus specified (that is, the device address of the first near field communication unit 1 of the communication apparatus CS1) and the data corresponding to the above processing are output to the first near field communication unit 1. Then, the first near field communication unit 1 of the communication apparatus CM1 transmits the data output from the communication control unit 73 to the communication apparatus CS1 by the first near field communication.

Thus, the data transmitted from the communication apparatus CM1 by the first near field communication is received by the first near field communication unit 1 of the communication apparatus CS1, and is output to the communication control unit 73 of the communication apparatus CS1. The communication control unit 73 of the communication apparatus CS1 determines whether or not the transmission source of the received data is the communication restriction partner on the basis of the communication partner list (step S14). In the example of FIG. 6, since the transmission source of the received data is the communication apparatus CM1, it is determined that the transmission source of the received data is not the communication restriction partner (step S14: NO), and the received data is passed to the processing unit 71 of the communication apparatus CS1.

Next, in step S15, the processing unit 71 of the communication apparatus CS1 performs predetermined processing according to the received data, and passes data (for example, response data) corresponding to the processing to the communication control unit 73 of the communication apparatus CS1. Next, the communication control unit 73 of the communication apparatus CS1 outputs the above-described data and the identification information corresponding to the communication apparatus CM1 (that is, the device address of the first near field communication unit 1 of the communication apparatus CM1) determined not to be the communication restriction partner to the first near field communication unit 1. Then, the first near field communication unit 1 of the communication apparatus CS1 transmits the data output from the communication control unit 73 to the communication apparatus CM1 by the first near field communication.

On the other hand, as illustrated in FIG. 6, in the communication apparatus CM2, none of the communication apparatuses CS1 to CS4 are in proximity to each other, and establishment of non-contact proximity communication is not performed. Therefore, in a case where the processing unit 71 of the communication apparatus CM2 performs predetermined processing according to the operation instruction signal or the like, and transmits data according to the processing by the first near field communication, the communication control unit 73 of the communication apparatus CM2 specifies all the communication apparatuses CS1 to CS4 for which the above-described link is established from the communication partner list as a communication partner whose communication restriction is not set (step S5). The identification information corresponding to each of the communication apparatuses CS1 to CS4 thus specified and the data according to the above-described processing are output to the first near field communication unit 1. Then, the first near field communication unit 1 of the communication apparatus CM2 transmits the data output from the communication control unit 73 to each of the communication apparatuses CS1 to CS4 by the first near field communication.

Thus, the data transmitted from the communication apparatus CM2 by the first near field communication is received by the first near field communication unit 1 of each of the communication apparatuses CS1 to CS4, and is output to the communication control unit 73 of each of the communication apparatuses CS1 to CS4. The communication control unit 73 of each of the communication apparatuses CS1 to CS4 determines whether or not the transmission source of the received data is the communication restriction partner on the basis of the communication partner list (steps S14, S23, S33, S43). Since the communication control unit 73 of the communication apparatus CS1 sets the communication apparatus CM2 as the communication restriction partner in the above-described step S13, the communication control unit 73 of the communication apparatus CS1 determines that the transmission source of the received data is the communication restriction partner (step S14: YES), and makes a transition to error processing.

On the other hand, since the communication control unit 73 of each of the communication apparatuses CS2 to CS4 does not set the communication apparatus CM2 as a communication restriction partner, the communication control unit 73 determines that the transmission source of the received data is not the communication restriction partner (steps S23, S33, S43: NO). Then, the communication control unit 73 of each of the communication apparatuses CS2 to CS4 performs predetermined processing according to the received data, and passes data according to the processing to the communication control unit 73 of each of the communication apparatuses CS2 to CS4. Next, the communication control unit 73 of each of the communication apparatuses CS2 to CS4 outputs the above-described data and the identification information corresponding to the communication apparatus CM2 determined not to be the communication restriction partner to the first near field communication unit 1. Then, the first near field communication unit 1 of each of the communication apparatuses CS2 to CS4 transmits the data output from the communication control unit 73 to the communication apparatus CM2 by the first near field communication.

Thereafter, in a case where the communication apparatus CM1 and the ID card D2 are brought into proximate with each other to enters the second communicable range of each other, the second near field communication unit 2 of the communication apparatus CM1 detects the ID card D2 to establish the non-contact proximity communication, and transmits request data to the ID card D2, so as to read the identification information stored in the ID card D2 (for example, the user ID "U002"), and acquire the identification information. As a result, the proximity communication detection unit 72 of the communication apparatus CM1 acquires the identification information from the second near field communication unit 2 (for example, the user ID "U002"), and detects that the ID card D2 has entered the second communicable range. Then, the near field communication detection unit 72 of the communication apparatus CM1 broadcasts the detection information including the identification information (for example, the user ID "U002") acquired from the detected ID card D2 to the communication apparatuses CS1 to CS4 for which the link is established by the first near field communication. Then, when the proximity communication detection unit 72 of the communication apparatus CM1 receives the confirmation information sent back from the communication apparatus CS2 corresponding to the ID card D2, while maintaining the establishment of the link with each of the communication apparatuses CS1 to CS4, the near field communication detection unit 72 removes the communication restriction setting for the communication apparatus CS2, and updates the communication restriction setting so as to set the communication apparatuses CS1, CS3 and CS4 as the communication restriction partners. On the other hand, when the proximity communication detection unit 72 of the communication apparatus CS2 receives the detection information broadcasted from the communication apparatus CM1, according to the determination result of the identification information, the proximity communication detection unit 72 sends back the confirmation information to the communication apparatus CM1 by the first near field communication, and while maintaining the establishment of the above-described link with each of the communication apparatuses CM1 to CM4, sets the communication apparatuses CM2 to CM4 as communication restriction partners. Note that the processing when the processing unit 71 of the communication apparatus CM1 performs predetermined processing according to the operation instruction signal or the like after the setting is similar to that of the communication apparatus CS1 as described above.

(Operation Example Illustrated in FIG. 7)

Next, in the example of FIG. 7, the login illustrated in FIG. 6 is not necessary in each of the communication apparatuses CS1 to CS4. Instead, in the example of FIG. 7, the device address of the first near field communication unit 1 of the communication apparatuses CS1 to CS4 corresponding to each ID card is stored in advance as identification information in the ID card D1 to D4. For example, the device address "A00001" of the first near field communication unit 1 of the communication apparatus CS1 is stored in advance as identification information in the ID card D1, and the device address "A00002" of the first near field communication unit 1 of the communication apparatus CS2 is stored in advance as identification information in the ID card D2. Note that the processing after step S53 illustrated in FIG. 7 are similar to the processing after step S3 illustrated in FIG. 6.

Step S51 illustrated in FIG. 7 is similar to step S1 illustrated in FIG. 6. Next, the communication control unit 73 of the communication apparatus CM1 causes the first near field communication unit 1 to unicast the detection information indicating that the ID card Dk has entered the second communicable range for the communication apparatus CS1 specified by the identification information acquired from the ID card D1 detected in step S51 (for example, the device address "A00001"). Then, while maintaining the establishment of the above-described link with each of the communication apparatuses CS1 to CS4, the communication control unit 73 of the communication apparatus CM1 sets the communication apparatuses CS2 to CS4 as the communication restriction partners (performs communication restriction setting) using the identification information acquired from the ID card D1 (for example, the device address "A00001") and the communication partner list (step S52). On the other hand, when the communication control unit 73 of the communication apparatus CS1 receives the detection information transmitted from the communication apparatus CM1 by the first near field communication, while maintaining the establishment of the above-described link with each of the communication apparatuses CM1 to CM4, the communication control unit 73 sets the communication apparatuses CM2 to CM4 as the communication restriction partners using the device address of the first near field communication unit 1 of the communication apparatus CM1 that has transmitted the detection information, and the communication partner list (step S61).

Also in the example of FIG. 7, the user ID of the user of the communication apparatus CSm corresponding to each may be stored in advance in the ID card Dk as identification information. In this case, in the communication apparatus CMn, a list in which the device address of the first near field communication unit 1 of the communication apparatuses CS1 to CS4 for which the above-described link is established is associated with the user ID of the user who uses the communication apparatuses CS1 to CS4. For example, the device address "A00001" of the first near field communication unit 1 of the communication apparatus CS1 and the user ID "U001" of the user who uses the communication apparatus CS1 are stored in association with each other. As a result, the communication control unit 73 of the communication apparatus CM1 can specify the device address "A00001" corresponding to the user ID "U001" acquired from the ID card D1 detected in step S51, and unicast detection information to the communication apparatus CS1 by the first near field communication.

As described above, according to the communication system S, in an arbitrary time zone such as a time zone in which particularly quick processing is required in at least one of the two specific communication apparatuses C, a time zone in which it is particularly required to prevent false recognition or confusion of the user who uses the communication apparatus C, or a time zone in which it is necessary to prevent the outflow of information exchanged between two specific communication apparatuses C, while the establishment of a link between a specific communication apparatus C and each of a plurality of communication partners is maintained, transmission and reception of data by the first near field communication with the other communication partner not performing the first near field communication in an arbitrary time zone can be efficiently restricted.

Furthermore, according to the communication system S, for example, each of the communication apparatuses CS2 to CS4 set as communication restriction partners by the communication apparatus CM1 can perform the first near field communication with the communication apparatuses CM2 to CM4, and, in addition, the above-described communication restriction setting can be performed such that the first near field communication is performed with any one of the communication apparatuses CM2 to CM4, so that the convenience of the entire communication system S can be improved.

[4. Power Supply Restriction Operation of Communication Apparatus C]

Next, referring to FIG. 8, the power supply restriction operation of the communication apparatus C will be described. FIG. 8 is a flowchart illustrating an example of power supply restriction processing in the control unit 7 of the communication apparatus C. The communication control unit 73 of the communication apparatus C monitors the execution of the first near field communication, and when detecting that the first near field communication is not performed with any of the plurality of communication partners for which the above-described link is established, starts the processing illustrated in FIG. 8.

When the processing illustrated in FIG. 8 is started, the communication control unit 73 starts incrementing the count value of the timer (that is, measuring the duration of the state where the first near field communication is not performed) (step S151). Next, the communication control unit 73 determines whether or not the first near field communication has started with any of the plurality of communication partners for which the above-described link is established (step S152). In a case where the communication control unit 73 determines that the first near field communication has started with any of the plurality of communication partners for which the above-described link is established (step S152: YES), resets a timer count value (that is, to 0) (step S153), and ends the processing illustrated in FIG. 8. On the other hand, in a case where the communication control unit 73 determines that the first near field communication is not started with any of the plurality of communication partners for which the above-described link is established (step S152: NO), the process proceeds to step S154.

In step S154, the communication control unit 73 determines whether or not the timer count value (measurement time) has reached a predetermined time (a time set in advance). In a case where the communication control unit 73 determines that the timer count value has not reached the predetermined time (step S154: NO), the process returns to step S152. On the other hand, in a case where the communication control unit 73 determines that the timer count value has reached the predetermined time (step S154: YES), the process proceeds to step S155.

In step S155, the communication control unit 73 determines whether or not communication restriction setting has been made for any of the plurality of communication partners for which the above-described link is established. In a case where the communication control unit 73 determines that the communication restriction setting is made for any of the plurality of communication partners for which the above-described link is established (step S155: YES), the communication control unit 73 resets the communication restriction setting (resets the communication restriction presence and absence value to "0") (step S156), and the process proceeds to step S157. On the other hand, in a case where the communication control unit 73 determines that the communication restriction setting is not made for any of the plurality of communication partners for which the above-described link is established (step S156: NO), the process proceeds to step S157.

In step S157, while maintaining the establishment of the link with each of the plurality of communication partners for which the above-described link is established, the communication control unit 73 performs the power supply restriction and ends the processing illustrated in FIG. 8. In the power supply restriction, as described above, the power consumption mode of the battery 6 is switched from the normal mode to the power saving mode. Note that, in the power saving mode in the communication apparatus CMn, the power supply from the battery 6 to the units other than the control unit 7 may be turned off, and even in this case, the second near field communication unit 2 may be activated by the power due to electromagnetic induction. Thereafter, in a case where it is detected that the ID card Dk has entered the second communicable range in the communication apparatus CMn, the communication control unit 73 switches the power consumption mode of the battery 6 from the power saving mode to the normal mode, and performs communication restriction setting as described above. On the other hand, in a case where the detection information from any of the communication apparatuses CMn is received in the communication apparatus CSm, the power consumption mode of the battery 6 is switched from the power saving mode to the normal mode, and the communication restriction setting is performed as described above.

As described above, according to the power supply restriction operation of the communication apparatus C, while preventing the power consumption of the battery 6, transmission and reception of data by first near field communication with communication partners that not performing first near field communication can be efficiently restricted in an arbitrary time zone.

[5. Application Example of Communication System S]

Figure 9:
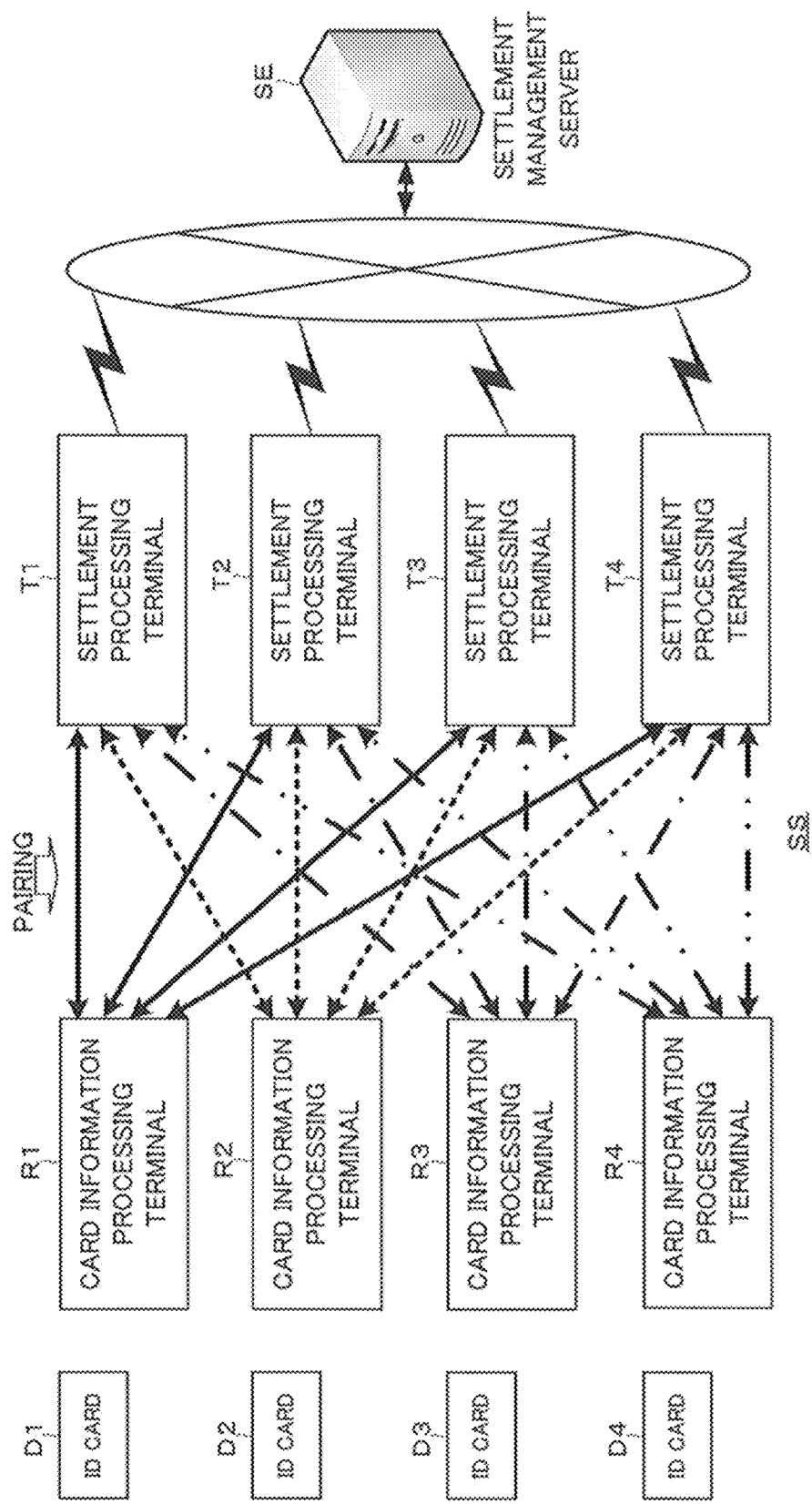
FIG. 9 is a figure illustrating an example of a schematic configuration of a settlement system SS.

Next, referring to FIG. 9 or the like, the example of the case of applying the above-described communication system S to a settlement system SS in a shop (for example, restaurant) will be described. FIG. 9 is a figure illustrating an example of a schematic configuration of the settlement system SS. In the example of FIG. 9, the settlement system SS comprises an ID card Dk (l=1, 2, 3, 4), a card information processing terminal Rm (m=1, 2, 3, 4), a settlement processing terminal Tn (n=1, 2, 3, 4), a settlement management server SE, and the like. For example, a dedicated reader/writer or the like is applied to the card information processing terminal Rm. As the settlement processing terminal Tn, for example, a tablet, a display apparatus fixedly installed on a table, or the like is applied.

The card information processing terminal Rm has the same configuration and function as those of the above-described communication apparatus CMn, and further comprises a card insertion unit and a contact communication interface unit (not illustrated). A settlement card CA mounted with an IC chip is inserted to the card insertion unit. Examples of the settlement card CA include a credit card and an electronic money card of a visiting customer. When the settlement card CA is inserted to the card insertion unit, the settlement card CA and the IC chip are electrically connected through terminals. As a result, the contact communication interface unit can perform contact communication with the IC chip of the settlement card CA inserted to the card insertion unit. Furthermore, the application installed in the card information processing terminal Rm includes an application for executing card information processing. As a result, the processing unit 71 of the card information processing terminal Rm reads out the card information recorded in the nonvolatile memory of the IC chip of the settlement card CA, and executes card information processing for processing the read out card information. For example, in a case where the settlement card CA is a credit card, the card information includes a credit card number, the name of the issue target of the credit card, the expiration date of the credit card, and the like. Furthermore, in a case where the settlement card CA is a server prepaid type electronic money compatible electronic money card, the card information includes an electronic money card number and the like. On the other hand, in a case where the settlement card CA is a stored value prepaid type electronic money compatible electronic money card, the card information includes the balance of the electronic value corresponding to the monetary value, and the like.

The settlement processing terminal Tn has the same configuration and function as those of the above-described communication apparatus CSm. Furthermore, the application installed in the settlement processing terminal Tn includes an application for executing settlement processing. As a result, the processing unit 71 of the settlement processing terminal Tn executes settlement processing for a given payment amount (billing amount) for the visiting customer. The payment amount is calculated by the settlement processing terminal Tn, for example, on the basis of the price input to the settlement processing terminal Tn according to the order of the customer. Note that, the settlement processing terminal Tn may also serve as an order reception terminal that displays a menu and receives an order. In this case, for example, the contents of the order may be transmitted from the settlement processing terminal Tn to the order receiving terminal by, for example, the first near field communication. Furthermore, the settlement processing is performed by a settlement method designated by the customer. The types of settlement methods include credit settlement and electronic money settlement. Note that electronic money settlement includes electronic money settlement by server prepaid type electronic money, and electronic money settlement by stored value prepaid type electronic money.

The settlement management server SE comprises, for example, at least any one server of a credit settlement management server and an electronic money settlement management server. Note that the settlement management server SE is connected to, for example, the Internet, and is used as necessary in settlement processing by the settlement processing terminal Tn. For example, the credit settlement management server is used for credit settlement. Furthermore, the electronic money settlement management server is used for electronic money settlement by server prepaid type electronic money. In the credit settlement management server, the credit card number, the name of the issue target of the credit card, the expiration date of the credit card, the credit limit amount (credit limit), the available amount, the account information of the issue target, and the like are stored in association with each issue target. Here, the credit limit amount is, for example, the upper limit allowable for the accumulation of shopping and cashing using a credit card. The available amount is the total amount of the credit card currently available (for example, the credit limit amount minus the current month's usage). The account information of the issue target includes the account number of the withdrawal account to which the payment amount for the credit settlement is debited, the financial institution ID identifying the financial institution that manages the account, and the like. Furthermore, in the electronic money settlement management server, the balance of the electronic value corresponding to the server prepaid type electronic money, the electronic money card number and the like are stored in association with each electronic money issue target.

FIG. 10 is a conceptual figure illustrating an example of the inside of a store. In payment settlement for a service provided by a store (for example, eating and drinking service), one ID card Dk, one card information processing terminal Rm, and one settlement processing terminal Tn are used. For example, as illustrated in FIG. 10(A), the ID cards D1 to D4 are carried by the clerks P1 to P4, and the card information processing terminals R1 to R4 are collected on a table, for example, at a predetermined place in the store. Note that, for example, it is assumed that the user ID of the clerk P1 who is the user of the ID card D1 is stored in the ID card D1 as identification information. Similarly, it is assumed that the user ID of the clerk P2 is stored in the ID card D2. On the other hand, the settlement processing terminals T1 to T6 are placed on the tables a to f used by customers. For example, the settlement processing terminal T1 is placed on the table a. Note that the settlement processing terminal T1 may be fixed to the table a, or may be delivered from any clerk as an order receiving terminal when the customer is seated on the chair of the table a.

Then, for example, at a predetermined timing when a customer is seated on a chair of the table a, when a customer of the table a requests a settlement or the like, the clerk P1 logs in from the settlement processing terminal T1 placed on the table a to store the user ID of the clerk P1 in a predetermined region of the memory of the settlement processing terminal T1. Here, for login is preferably performed, for example, by bringing the ID card D1 close to the settlement processing terminal T1 by the clerk P1 so that the user ID stored in the ID card D1 is read by the second near field communication unit 2 of the settlement processing terminal T1. Alternatively, the login may be performed by operating the operation and display unit 4 of the settlement processing terminal T1 by the clerk P1 to display the login screen and inputting the user ID of the clerk P1. On the other hand, the clerk P2 logs in from the settlement processing terminal T2 placed on the table b to store the user ID of the clerk P2 in a predetermined region of the memory of the settlement processing terminal T2. Note that, in a case where the combination of the settlement processing terminal Tn and the clerk is determined in advance (for example, in a case where the clerk P1 is assigned to the settlement processing terminal T1 and the clerk P2 is assigned to the settlement processing terminal T2), for example, when opening a store, login to each settlement processing terminal Tn may be performed.

Thereafter, when settlement is performed in response to the request of the visiting customer of the table a (for example, when the customer finishes eating and is about to leave), the clerk P1 brings, for example, the card information processing terminal R1 among the card information processing terminals R1 to R4 out from the above-described place, brings the card information processing terminal R1 and the ID card D1, and goes to the table a used by the customer. When the clerk P1 arrives at the table a used by the customer as illustrated in FIG. 10(B), the clerk P1 operates the operation and display unit 4 of the settlement processing terminal T1 to present the payment amount displayed on the screen to the customer. Then, the clerk P1 checks the settlement method to the customer, and receives the customer's settlement card CA.

Hereinafter, the operation of the settlement system SS when the ID card D1, the card information processing terminal R1, and the settlement processing terminal T1 are used for settlement will be described. Note that the card information processing terminal R1 establishes a link by pairing with each of the settlement processing terminals T1 to T4, and the settlement processing terminal T1 establishes a link by pairing with each of the card information processing terminals R1 to R4.

(Operation Example 1 of Settlement System SS)

Figure 11:
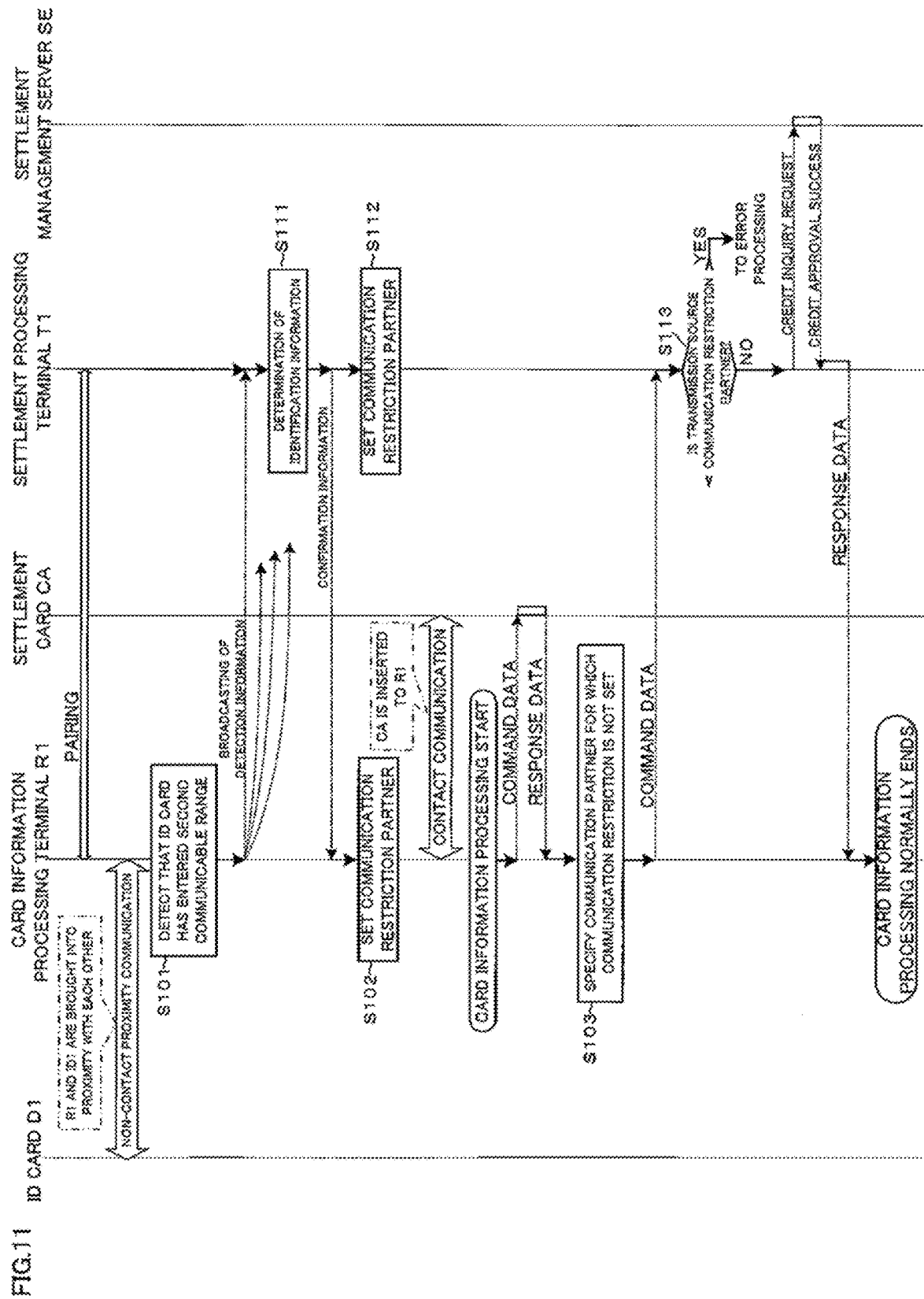
FIG. 11 is a sequence figure illustrating an example of operation of the settlement system SS in a case where the settlement method is credit settlement.

First, referring to FIG. 11, the operation of the settlement system SS in a case where the settlement method is the credit settlement will be described. FIG. 11 is a sequence figure illustrating an example of operation of the settlement system SS in the case where the settlement method is credit settlement. Note that the example of FIG. 11 illustrates the case where detection information is broadcasted.

In a case where the clerk P1 brings out the card information processing terminal R1, the ID card D1 carried by the clerk P1 and the card information processing terminal R1 are brought into proximity with each other to enter the second communicable range of each other, so that, as illustrated in FIG. 11, the second near field communication unit 2 of the card information processing terminal R1 detects the ID card D1, establishes non-contact proximity communication, and acquires a user ID from the ID card D1. As a result, the proximity communication detection unit 72 of the card information processing terminal R1 acquires the user ID of the clerk P1, and detects that the ID card D1 has entered the second communicable range (step S101).

Next, the communication control unit 73 of card information processing terminal R1 causes the first near field communication unit 1 to broadcast detection information including the user ID acquired from the ID card D1 detected in step S101 to the settlement processing terminals T1 to T4 for which the above-described link is established. The detection information thus broadcasted is received by the first near field communication unit 1. Then, the communication control unit 73 of the settlement processing terminal T1 determines whether or not the user ID included in the received detection information matches the user ID stored due to login (steps S111).

Here, since the user ID included in the above-described detection information matches the user ID stored due to login, the communication control unit 73 of the settlement processing terminal T1 causes the confirmation information indicating a match of the identification information to be sent back, by the first near field communication, to the card information processing terminal R1 that has transmitted the detection information. On the other hand, the settlement processing terminals T2 to T4 that have received the broadcast detection information do not transmit the confirmation information because the user ID included in the detection information does not match the user ID stored due to login.

Note that, as described in the operation example illustrated in FIG. 7, in a case where the settlement processing terminal T1 is specified from the identification information acquired from the ID card D1, the communication control unit 73 of the card information processing terminal R1 may cause the first near field communication unit 1 to unicast the detection information indicating that the ID card D1 has entered the second communicable range to the settlement processing terminal T1.

Next, while maintaining the establishment of the above-described link with each of the card information processing terminals R1 to R4, the communication control unit 73 of the settlement processing terminal T1 sets the card information processing terminals R2 to R4 as communication restriction partners using the device address of the first near field communication unit 1 of the card information processing terminal R1 that has transmitted the above-described detection information, and the communication partner list (step S112).

On the other hand, when the communication control unit 73 of the card information processing terminal R1 receives the confirmation information sent back from the settlement processing terminal T1 by the first near field communication, while maintaining the establishment of the above-described link with each of the settlement processing terminals T1 to T4, the communication control unit 73 sets the settlement processing terminals T2 to T4 as the communication restriction partners using the device address included in the confirmation information and the communication partner list (step S102).

Thereafter, the clerk P1 reaches the table a used by the customer, inserts the settlement card CA (a credit card in the example of FIG. 11) received from the customer to the card insertion unit of the card information processing terminal R1, and lets the customer enter the pass number from the operation and display unit 4 of the card information processing terminal R1. The card information processing terminal R1 authenticates the settlement card CA according to the input pass number, and when the authentication is successful, contact communication is established between the card information processing terminal R1 and the IC chip of the settlement card CA, and the card information processing starts.

When the card information processing is started, the processing unit 71 of the card information processing terminal R1 transmits command data indicating a read command to the settlement card CA via the contact communication interface unit. The IC chip of the settlement card CA reads out the card information from the non-volatile memory according to the read command indicated by the received command data, and transmits response data including the read out card information to the card information processing terminal R1. The card information includes a credit card number, the name of the issue target of the credit card, the expiration date of the credit card, and the like.

Next, the processing unit 71 of the card information processing terminal R1 generates command data indicating the settlement command according to the response data received from the settlement card CA via the contact communication interface unit, and passes the generated command data to the communication control unit 73. The command data indicating the settlement command includes the card information read from the settlement card CA. Then, the communication control unit 73 of the card information processing terminal R1 specifies the settlement processing terminal T1 as the communication partner whose communication restriction is not set, from the communication partner list (step S103). The device address of the first near field communication unit 1 of the card information processing terminal R1 thus specified and the command data indicating the settlement command are output to the first near field communication unit 1. Then, the first near field communication unit 1 of the card information processing terminal R1 transmits command data indicating the settlement command output from the communication control unit 73 to the settlement processing terminal T1 by the first near field communication.

In this way, the command data transmitted from the card information processing terminal R1 by the first near field communication is received by the first near field communication unit 1 of the settlement processing terminal T1, and output to the communication control unit 73 of the settlement processing terminal T1. The communication control unit 73 of the settlement processing terminal T1 determines whether or not the transmission source of the received command data is the communication restriction partner on the basis of the communication partner list (step S113).

In the example of FIG. 11, since the transmission source of the received command data is the card information processing terminal R1, it is determined that the transmission source of the received command data is not the communication restriction partner (step S113: NO), and the received command data is passed to the processing unit 71 of the settlement processing terminal T1. As a result, the processing unit 71 of the settlement processing terminal T1 starts the settlement processing according to the command data indicating the settlement command, generates data indicating a credit inquiry (also referred to as authorization or authori) request, and passes the generated data indicating the credit inquiry request to the communication control unit 73. The data indicating the credit inquiry request includes card information included in command data received from the card information processing terminal R1, settlement amount information indicating the above-described settlement amount, and the like. Then, the communication control unit 73 of the settlement processing terminal T1 accesses the settlement management server SE via the mobile wireless communication unit 3, and transmits the data indicating the above-described credit inquiry request to the settlement management server SE (credit settlement management server) via the mobile wireless communication unit 3.

The settlement management server SE makes a credit inquiry as to whether or not credit settlement is possible, in accordance with data indicating a credit inquiry request from the settlement processing terminal T1. Then, for example, in a case where the expiration date of the credit card has not passed and the above-described payment amount indicated by the payment amount information does not exceed the available amount, the settlement management server SE transmits data indicating credit approval success to the settlement processing terminal T1. On the other hand, for example, in a case where the expiration date of the credit card has passed, or in a case where the above-described payment amount indicated by the payment amount information exceeds the available amount, data indicating credit approval failure is transmitted to the settlement processing terminal T1.

In this way, when data indicating the credit approval success is received from the settlement management server SE by the settlement processing terminal T1, the processing unit 73 of the settlement processing terminal T1 generates response data indicating the credit approval success as response data with respect to the settlement command, and passes the generated response data to the communication control unit 73. Next, the communication control unit 73 of the settlement processing terminal T1 outputs response data indicating credit approval success to the first near field communication unit 1. Then, the first near field communication unit 1 of the settlement processing terminal T1 transmits response data indicating credit approval success output from the communication control unit 73 to the card information processing terminal R1 by the first near field communication. As a result, the settlement processing ends normally. On the other hand, when data indicating credit approval failure is received by the settlement processing terminal T1, response data indicating a credit approval failure is transmitted from the settlement processing terminal T1 to the card information processing terminal R1, and the settlement processing ends abnormally.

Then, the response data transmitted from the settlement processing terminal T1 by the first near field communication is received by the first near field communication unit 1 of the card information processing terminal R1, and output to the processing unit 71 via the communication control unit 73 of the card information processing terminal R1. In a case where the response data indicates credit approval success, the card information processing ends normally. As a result, the clerk P1 returns the card information processing terminal R1 to the original predetermined place.

Thereafter, in a case where the clerk P2 brings out the card information processing terminal R1, the ID information card D2 carried by the clerk P2 is brought into proximity with the card information processing terminal R1 so that the card information processing terminal R1 acquires the user ID from the ID card D2. As a result, the card information processing terminal R1 acquires the user ID of the clerk P2, detects that the ID card D2 has entered the second communicable range, and broadcasts the detection information including the user ID of the clerk P2 to the settlement processing terminal T1 to T4 for which the above-described link is established.

Then, each of the settlement processing terminals T1 to T4 receives the broadcasted detection information, and determines whether or not the user ID included in the detection information matches the user ID stored due to login. In this case, since the user ID included in the detection information matches the user ID stored in the settlement processing terminal T2, while maintaining the establishment of the above-described link with each of the card information processing terminals R1 to R4, the settlement processing terminal T2 sets the card information processing terminals R2 to R4 as communication restriction partners, and sends back the above-described confirmation information to the card information processing terminal R1. As a result, while maintaining the establishment of the above-described link with each of the settlement processing terminals T1 to T4, the card information processing terminal R1 removes the communication restriction setting for the settlement processing terminal T2, and updates the communication restriction setting so as to set the settlement processing terminals T1, T3 and T4 as the communication restriction partners (the subsequent processing is similar to the case of the clerk P1).

Note that the settlement processing terminal T1 preferably resets all the communication restriction settings (that is, remove the restriction of the transmission and reception of data with all the communication restriction partners) at the timing when the settlement processing ends. Furthermore, the card information processing terminal R1 may reset all communication restriction settings at the timing when the card information processing ends.

(Operation Example 2 of Settlement System SS)

Figure 12:
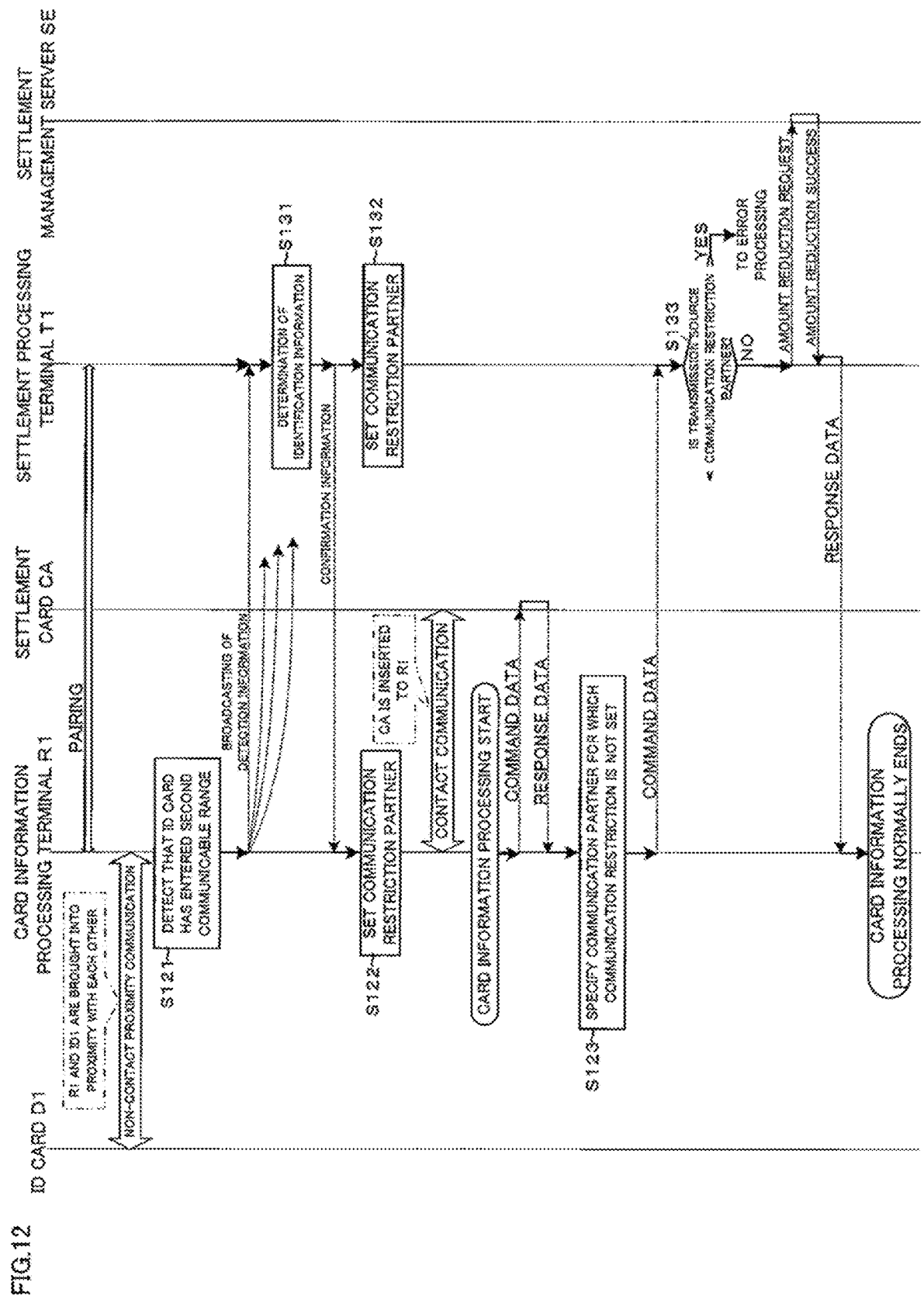
FIG. 12 is a sequence figure illustrating an example of the operation of the settlement system SS in a case where the settlement method is electronic money settlement by server prepaid type electronic money.

Next, referring to FIG. 12, operation of the settlement system SS in a case where the settlement method is electronic money settlement by server prepaid type electronic money will be described. FIG. 12 is a sequence figure illustrating an example of the operation of the settlement system SS in a case where the settlement method is electronic money settlement by server prepaid type electronic money. Note that the example of FIG. 12 illustrates the case where detection information is broadcasted. Furthermore, the processing of steps S121 to S122 illustrated in FIG. 12 is similar to the processing of steps S101 to S102 illustrated in FIG. 11. Furthermore, the processing of steps S131 to S132 illustrated in FIG. 12 is similar to the processing of steps S111 to S112 illustrated in FIG. 11.

The clerk P1 reaches the table a used by the customer, inserts the settlement card CA (an electronic money card in the example of FIG. 12) received from the customer to the card insertion unit of the card information processing terminal R1, and lets the customer enter the pass number from the operation and display unit 4 of the card information processing terminal R1. The card information processing terminal R1 authenticates the settlement card CA according to the input pass number, and when the authentication is successful, contact communication is established between the card information processing terminal R1 and the IC chip of the settlement card CA, and the card information processing starts.

When the card information processing is started, the processing unit 71 of the card information processing terminal R1 transmits command data indicating a read command to the settlement card CA via the contact communication interface unit. The IC chip of the settlement card CA reads out the card information from the non-volatile memory according to the read command indicated by the received command data, and transmits response data including the read out card information to the card information processing terminal R1. The card information includes an electronic money card number and the like.

Next, the processing unit 71 of the card information processing terminal R1 generates command data indicating the settlement command according to the response data received from the settlement card CA via the contact communication interface unit, and passes the generated command data to the communication control unit 73. The command data indicating the settlement command includes the card information read from the settlement card CA. Then, the communication control unit 73 of the card information processing terminal R1 specifies the settlement processing terminal T1 as the communication partner whose communication restriction is not set, from the communication partner list (step S123). The device address of the first near field communication unit 1 of the card information processing terminal R1 thus specified and the command data indicating the settlement command are output to the first near field communication unit 1. Then, the first near field communication unit 1 of the card information processing terminal R1 transmits command data indicating the settlement command output from the communication control unit 73 to the settlement processing terminal T1 by the first near field communication.

In this way, the command data transmitted from the card information processing terminal R1 by the first near field communication is received by the first near field communication unit 1 of the settlement processing terminal T1, and output to the communication control unit 73 of the settlement processing terminal T1. The communication control unit 73 of the settlement processing terminal T1 determines whether or not the transmission source of the received command data is the communication restriction partner on the basis of the communication partner list (step S133).

In the example of FIG. 12, since the transmission source of the received command data is the card information processing terminal R1, it is determined that the transmission source of the received command data is not the communication restriction partner (step S133: NO), and the received command data is passed to the processing unit 71 of the settlement processing terminal T1. As a result, the processing unit 71 of the settlement processing terminal T1 starts the settlement processing according to the command data indicating the settlement command, generates data indicating an amount reduction request of an electronic value, and passes the generated data indicating the amount reduction request to the communication control unit 73. The data indicating the amount reduction request includes card information included in command data received from the card information processing terminal R1, settlement amount information indicating the above-described settlement amount, and the like. Then, the communication control unit 73 of the settlement processing terminal T1 accesses the settlement management server SE via the mobile wireless communication unit 3, and transmits the data indicating the above-described amount reduction request to the settlement management server SE (electronic money settlement management server) via the mobile wireless communication unit 3.

The settlement management server SE specifies the balance of the electronic value of the electronic money issue target (the owner) according to the data indicating the amount reduction request from the settlement processing terminal T1, from the electronic money card number indicated by the card information included in the data, to make a balance inquiry as to whether or not electronic money settlement is possible. Then, in a case where the balance of the electronic value is equal to or more than the payment amount indicated by the above-described payment amount information, the settlement management server SE reduces the balance of the electronic value by the payment amount, and transmits data indicating reduction success of the electronic value to the settlement processing terminal T1. On the other hand, in a case where the balance of the electronic value is not equal to or more than the payment amount, data indicating the reduction failure of the electronic value is transmitted to the settlement processing terminal T1.

In this way, when data indicating the amount reduction success is received from the settlement management server SE by the settlement processing terminal T1, the processing unit 73 of the settlement processing terminal T1 generates response data indicating the amount reduction success as response data with respect to the settlement command, and passes the generated response data to the communication control unit 73. Next, the communication control unit 73 of the settlement processing terminal T1 outputs response data indicating that amount reduction success to the first near field communication unit 1. Then, the first near field communication unit 1 of the settlement processing terminal T1 transmits response data indicating amount reduction success output from the communication control unit 73 to the card information processing terminal R1 by the first near field communication. As a result, the settlement processing ends normally. On the other hand, when data indicating amount reduction failure is received by the settlement processing terminal T1, response data indicating an amount reduction failure is transmitted from the settlement processing terminal T1 to the card information processing terminal R1, and the settlement processing ends abnormally.

Then, the response data transmitted from the settlement processing terminal T1 by the first near field communication is received by the first near field communication unit 1 of the card information processing terminal R1, and output to the processing unit 71 via the communication control unit 73 of the card information processing terminal R1. In a case where the response data indicates amount reduction success, the card information processing ends normally. As a result, the clerk P1 returns the card information processing terminal R1 to the original predetermined place.

Note that, although the example of FIG. 12 describes the operation of the settlement system SS in a case where the settlement method is electronic money settlement by server prepaid type electronic money, also in a case of the operation of the settlement system SS of a case where the settlement method is electronic money settlement by stored value prepaid type electronic money, the processing is basically similar to the processing of steps S121 to S123 and S131 to S133 illustrated in FIG. 12. However, in a case of electronic money settlement by stored value prepaid type electronic money, the settlement management server SE is not used, and the balance of the electronic value is reduced by the payment amount according to an instruction from the card information processing terminal R1, by the settlement card CA. Note that the transmission and reception of data between the settlement card CA and the card information processing terminal R1 may be performed by non-contact proximity communication.

As described above, according to the settlement system SS, for example, in an arbitrary time zone when the card information processing terminal R1 and the settlement processing terminal T1 are used for settlement, while each maintaining establishment of the link with each of the plurality of communication partners, the card information processing terminal R1 and the settlement processing terminal T1 respectively can efficiently restrict transmission and reception of data by the first near field communication with another communication partner not performing the first near field communication in the arbitrary time zone. As a result, the card information processing terminal R1 and the settlement processing terminal T1 can perform quick processing, it is possible to prevent particularly the false recognition or confusion of the user who uses the card information processing terminal R1 and the settlement processing terminal T1, and it is possible to prevent the outflow of information exchanged between the card information processing terminal R1 and the settlement processing terminal T1. Furthermore, even in a case where, for example, settlements of a plurality of different customers are performed in the same time zone, it is possible to reliably prevent each settlement from being performed erroneously.

In addition, according to the settlement system SS, while the card information processing terminal R1 maintaining the establishment of the link with the settlement processing terminals T1 to T4 is commonly used by clerks, under the situation where the settlement processing terminal T1 maintaining the establishment of the link with the card information processing terminals R1 to R4 is placed on a table used by a customer or the like, transmission and reception of data by the first near field communication can be secured only between the card information processing terminal R1 and the settlement processing terminal T1 simply by bringing the ID card D1 carried by the clerk P1 and the card information processing terminal R1 into proximity with each other.

Note that the communication system S is applicable not only to the settlement system SS but also to, for example, a security system in which a guard needs to use a pair of two communication apparatuses C in a facility or a building.

Furthermore, in the above-described embodiment, the case where the near field communication method based on BT is adopted as the first near field communication method has been described, but instead, a near field communication method based on a wireless LAN standard such as Wi-Fi (registered trademark) or the near field communication method based on a ZIGBEE (registered trademark) may be adopted. Furthermore, in the above-described embodiment, the case where the near field communication method based on NFC is adopted as the second near field communication method has been described, but a near field communication method based on infrared data association (IrDA) technology or TransferJet (registered trademark) may be adopted. In the above-described embodiment, although a master apparatus and a slave apparatus in the near field communication method based on BT are assumed, the present invention is also applicable to a communication system in which there is no distinction between a master apparatus and a slave apparatus, that is, a communication system in which both of the two communication apparatuses can take the initiative in the first near field communication.

Furthermore, in the above-described embodiment, the case where the communication system S comprises the plurality of communication apparatuses CMm and the plurality of communication apparatuses CSm has been described as an example. However, the present invention is also applicable to a communication system in which one communication apparatus CMn and a plurality of communication apparatuses CSm are comprised, one communication apparatus CMn establishes a link with each of the plurality of communication apparatuses CSm, and the first near field communication is performed with the communication apparatus CSm existing in the first communicable range. In this case, since each communication apparatus CSm naturally performs the first near field communication with only one communication apparatus CMn, there is no need for the communication apparatus CMn to transmit the above-described detection information to the communication apparatus CSm in a case where the communication apparatus CMn detects that the ID card Dk has entered the second communicable range (that is, in this case, only the communication apparatus CMn performs the above-described communication restriction setting). Furthermore, the present invention is also applicable to a communication system in which a plurality of communication apparatuses CMn and one communication apparatus CSm are comprised, the plurality of communication apparatuses CMn establish a link with of one communication apparatus CSm, and the first near field communication is performed with the communication apparatus CSm existing in the first communicable range. In this case, since each communication apparatus CMn naturally performs the first near field communication with only one communication apparatus CSm, it is sufficient that the communication apparatus CMn transmits the above-described detection information to the communication apparatus CSm in a case where the communication apparatus CMn detects that the ID card Dk has entered the second communicable range, and there is no need to perform the above-described communication restriction setting (that is, in this case, only the communication apparatus CSm performs the above-described communication restriction setting).

DESCRIPTION OF REFERENCE NUMERALS

1 First near field communication unit
2 Second near field communication unit
3 Mobile wireless communication unit
4 Operation and display unit
5 Storage unit
6 Battery
7 Control unit
71 Processing unit
72 Proximity communication detection unit
73 Communication control unit
C, CMn, CSm Communication apparatus
Dk ID card
S Communication system

The invention claimed is:

1. A communication apparatus comprising:
a first near field communication transceiver that establishes a link necessary for first near field communication with a plurality of communication partners existing in a first communicable range, and then performs the first near field communication with the communication partners for which the link is established,
at least one memory configured to store computer program code;
at least one processor configured to access said computer program code and operate as instructed by the computer program code, the computer program code including:
communication control code configured to cause at least one of the at least one processor to control communication such that in a case where a communication partner transmits detection information indicating that a portable storage medium has entered a second communicable range narrower than the first communicable range, to the communication apparatus for which the link is established by the first near field communication, and where the detection information transmitted from the communication partner for which the link is established is received, the communications control code causes at least one of the at least one processor to, while maintaining establishment of the link with each of the plurality of communication partners for which the link is established, restrict transmission and reception of data by the first near field communication with the communication partners other than the communication partner that has transmitted the detection information.

2. The communication apparatus according to claim 1, wherein, in a case where another detection information is received from a communication partner whose transmission and reception of data by the first near field communication is restricted, the communication partner different from the communication partner that has transmitted the detection information first, the communication control code causes at least one of the at least one processor to, while maintaining the establishment of the link with each of the plurality of communication partners for which the link is established, remove restriction of the transmission and reception of the data with the communication partner that has transmitted the another detection information, and restrict transmission and reception of data by the first near field communication with the communication partners other than the communication partner whose restriction of the transmission and reception of data has been removed.

3. The communication apparatus according to claim 1, wherein the communication control code is configured to cause at least one of the at least one processor to not respond to a predetermined command by the first near field communication from the communication partner whose transmission and reception of data by the first near field communication is restricted.

4. The communication apparatus according to claim 1, further comprising a battery that supplies power to the communication apparatus,
   wherein, in a case where a state in which the first near field communication is not performed with any of the plurality of communication partners for which the link is established continues for a predetermined time, while maintaining establishment of the link with each of the plurality of communication partners for which the link is established, the communication control code causes at least one of the at least one processor to switch a power consumption mode of the battery from a normal mode to a power saving mode, and thereafter, in a case where the detection information from any one of the plurality of communication partners for which the link is established is received, the communication control code causes at least one of the at least one processor to switch the power consumption mode of the battery from the power saving mode to the normal mode, and restrict transmission and reception of data by the first near field communication with the communication partners other than the communication partner that has transmitted the detection information.

5. The communication apparatus according to claim 4, wherein, in a case where the state in which the first near field communication is not performed with any of the plurality of communication partners for which the link is established continues for the predetermined time, while maintaining establishment of the link with each of the plurality of communication partners for which the link is established, the communication control code causes at least one of the at least one processor to switch a power consumption mode of the battery from a normal mode to a power saving mode, and remove the restriction with all the communication partners whose transmission and reception of data by the first near field communication has been restricted.

6. The communication apparatus according to claim 1,
   wherein each of the communication partners broadcasts the detection information including identification information acquired from the detected portable storage medium to the plurality of communication apparatuses for which the link is established by the first near field communication,
   at least one of the at least one memory stores identification information corresponding to the communication apparatus, and
   only in a case where the broadcasted detection information is received, and the identification information included in the detection information matches the identification information stored, while maintaining establishment of the link with each of the plurality of communication partners for which the link is established, the communication control code causes at least one of the at least one processor to restrict transmission and reception of data by the first near field communication with the communication partners other than the communication partner that has transmitted the detection information.

7. The communication apparatus according to claim 1,
   wherein each of the communication partners unicasts the detection information to a communication apparatus corresponding to identification information acquired from the detected portable storage medium by the first near field communication, and
   in a case where the unicasted detection information is received, while maintaining establishment of the link with each of the plurality of communication partners for which the link is established, the communication control code causes at least one of the at least one processor to restrict transmission and reception of data by the first near field communication with the communication partners other than the communication partner that has transmitted the detection information.

8. A communication apparatus comprising:
   a first communication transceiver that establishes a link necessary for first near field communication with a communication partner existing in a first communicable range, and then performs the first near field communication with the communication partner for which the link is established;
   a second communication transceiver that performs second near field communication with a communication partner existing in a second communicable range narrower than the first communicable range;
   a near field detector that detects that a portable storage medium capable of the second near field communication has entered the second communicable range;
   at least one memory configured to store computer program code; and
   at least one processor configured to access said computer program code and operate as instructed by the computer program code, the computer program code including:
   communication control code configured to cause at least one of the at least one processor to, in a case where the detector detects that the portable storage medium has entered the second communicable range, cause the first communication transceiver to transmit detection information indicating that the portable storage medium has entered the second communicable range to at least a first communication partner for which the link is established, and cause the first communication transceiver to modify transmission and reception of data by the first near field communication with at least a second communication partner for which the link is established.

9. The communication apparatus according to claim 8, wherein while maintaining establishment of the link with each of a plurality of communication partners for which the link is established, the communication control code causes at least one of the at least one processor to restrict transmission and reception of data by the first near field communication with communication partners other than a communication partner corresponding to the portable storage medium whose entrance to the second communicable range has been detected.

10. The communication apparatus according to claim 8, wherein, in a case where the detector detects that another portable storage medium has entered the second communicable range, the communication control code causes at least one of the at least one processor to cause the first communication transceiver to transmit detection information indicating that the portable storage medium has entered the second communicable range to at least one communication partner for which the link is established.

11. The communication apparatus according to claim 10, wherein while maintaining establishment of the link with each of a plurality of communication partners for which the link is established, the communication control code causes at least one of the at least one processor to remove restriction of transmission and reception of the data with a communication partner corresponding to the another portable storage medium whose entrance to the second communicable range has been detected, and restrict transmission and reception of data by the first near field communication with communication partners other than the communication partner corresponding to the another portable storage medium.

12. The communication apparatus according to claim 8, further comprising
a battery that supplies power to the communication apparatus,
wherein, in a case where a state in which the first near field communication is not performed with any of a plurality of communication partners for which the link is established continues for a predetermined time, while maintaining establishment of the link with each of the plurality of communication partners for which the link is established, the communication control code causes at least one of the at least one processor to switch a power consumption mode of the battery from a normal mode to a power saving mode, and thereafter, in a case where it is detected that the portable storage medium has entered the second communicable range, the communication control code causes at least one of the at least one processor to switch the power consumption mode of the battery from the power saving mode to the normal mode, and restrict transmission and reception of data by the first near field communication with the communication partners other than the communication partner corresponding to the portable storage medium, whose entrance to the second communicable range has been detected.

13. The communication apparatus according to claim 12, wherein, in a case where the state in which the first near field communication is not performed with any of the plurality of communication partners for which the link is established continues for the predetermined time, while maintaining establishment of the link with each of the plurality of communication partners for which the link is established, the communication control code causes at least one of the at least one processor to switch a power consumption mode of the battery from a normal mode to a power saving mode, and remove the restriction with all the communication partners whose transmission and reception of data by the first near field communication has been restricted.

14. The communication apparatus according to claim 8, wherein the communication control code causes at least one of the at least one processor to cause the first communication transceiver to broadcast the detection information including identification information acquired from the detected portable storage medium to a plurality of communication partners for which the link is established.

15. The communication apparatus according to claim 8, wherein the communication control code is configured to cause at least one of the at least one processor to cause the first communication transceiver to unicast the detection information to one communication partner identified by identification information acquired from the detected portable storage medium, the communication partner for which the link is established.

16. A communication system comprising a plurality of communication apparatuses, comprising:
a first communication apparatus comprising
a first communication transceiver that establishes a link necessary for first near field communication with a communication partner existing in a first communicable range, and then performs the first near field communication with the communication partner for which the link is established,
a second communication transceiver that performs second near field communication with a communication partner existing in a second communicable range narrower than the first communicable range,
a near field detector that detects that a portable storage medium capable of the second near field communication has entered the second communicable range of the second communication transceiver,
at least one first memory configured to store computer program code; and
at least one first processor configured to access said computer program code and operate as instructed by the computer program code, the computer program code including:
first communication control code configured to cause at least one of the at least one processor to, in a case where the near field detector detects that the portable storage medium has entered the second communicable range, causes the first communication transceiver to transmit detection information indicating that the portable storage medium has entered the second communicable range to a second communication apparatus that is at least one communication partner for which the link is established; and
a second communication apparatus comprising
a third communication transceiver that establishes a link necessary for first near field communication with a communication partner existing in the first communicable range, and then performs the first near field communication with the communication partner for which the link is established,
at least one second memory configured to store second computer program code; and
at least one second processor configured to access said second computer program code and operate as instructed by the second computer program code, the second computer program code including:
second communication control code configured to cause at least one of the at least one second processor to, in a case where the detection information transmitted from the first communication apparatus, which is one of the plurality of communication partners for which the link is established, is received, while maintaining establishment of the link with each of the plurality of communication partners for which the link is established, restricts transmission and reception of data by the first near field communication with the communication partners other than the first communication apparatus that has transmitted the detection information.

17. A communication method performed by a computer comprising:
establishing a link necessary for first near field communication with a plurality of communication partners existing in a first communicable range;

performing the first near field communication with the communication partners for which the link is established;

detecting a portable storage medium that has entered a second communicable range narrower than the first communicable range;

receiving detection information indicating that the portable storage medium has entered the second communicable range to the communication apparatus for which the link is established by the first near field communication; and while maintaining establishment of the link with each of the plurality of communication partners for which the link is established, restricting transmission and reception of data by the first near field communication with the communication partners other than the communication partner that has transmitted the detection information.

18. A communication method performed by a computer comprising:

establishing a link necessary for first near field communication with a communication partner existing in a first communicable range, and then performing the first near field communication with the communication partner for which the link is established;

performing second near field communication with a communication partner existing in a second communicable range narrower than the first communicable range;

detecting that a portable storage medium capable of the second near field communication has entered the second communicable range; and in a case where it is detected that the portable storage medium has entered the second communicable range, transmitting detection information indicating that the portable storage medium has entered the second communicable range to at least a first communication partner for which the link is established by the first near field communication, and modifying transmission and reception of data to at least a second communication partner for which the link is established by the first near field communication.

19. A non-transitory computer readable storage medium storing a communication processing program for a computer that establishes a link necessary for first near field communication with a plurality of communication partners existing in a first communicable range, and then performs the first near field communication with the communication partner for which the link is established, wherein in a case where a portable storage medium that has entered a second communicable range narrower than the first communicable range is detected, the computer receives from a communication partner detection information indicating that the portable storage medium has entered the second communicable range to the communication apparatus for which the link is established by the first near field communication, and the communication processing program causes the computer to, while maintaining establishment of the link with each of the plurality of communication partners for which the link is established, restrict transmission and reception of data by the first near field communication with the communication partners other than the communication partner that has transmitted the detection information.

20. A non-transitory computer readable storage medium having stored thereon a communication processing program that controls communications of a computer, the computer comprising:

a first communication transceiver that establishes a link necessary for first near field communication with a communication partner existing in a first communicable range, and then performs the first near field communication with the communication partner for which the link is established;

a second communication transceiver that performs second near field communication with a communication partner existing in a second communicable range narrower than the first communicable range;

the communication processing program causing the computer to detect that a portable storage medium capable of the second near field communication has entered the second communicable range; and in a case where the portable storage medium has been detected to have entered the second communicable range, transmit detection information indicating that the portable storage medium has entered the second communicable range to at least one communication partner for which the link is established by the first near field communication, and modify transmission and reception of data to at least a second communication partner for which the link is established by the first near field communication.

* * * * *